US 8,020,429 B2

(12) United States Patent
Kaneko et al.

(10) Patent No.: US 8,020,429 B2
(45) Date of Patent: Sep. 20, 2011

(54) DEVICE AND METHOD FOR DETERMINING KNOCKING OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Norihito Hanai, Toyota (JP); Yasuhiro Yamasako, Toyota (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 653 days.

(21) Appl. No.: 12/278,791

(22) PCT Filed: Jun. 27, 2007

(86) PCT No.: PCT/JP2007/063334
§ 371 (c)(1),
(2), (4) Date: Aug. 8, 2008

(87) PCT Pub. No.: WO2008/001939
PCT Pub. Date: Jan. 3, 2008

(65) Prior Publication Data
US 2010/0162793 A1 Jul. 1, 2010

(30) Foreign Application Priority Data

Jun. 28, 2006 (JP) ................................. 2006-178300
Jun. 8, 2007 (JP) ................................. 2007-153148

(51) Int. Cl.
*G01L 23/22* (2006.01)
(52) U.S. Cl. ..................... 73/35.01; 73/35.03; 73/35.06; 73/114.07
(58) Field of Classification Search ................. 73/35.01, 73/35.03, 35.06, 114.07
See application file for complete search history.

(56) References Cited

U.S. PATENT DOCUMENTS 7,478,622 B2 * 1/2009 Kaneko et al. ........... 123/406.29
7,681,552 B2 * 3/2010 Kaneko et al. ........... 123/406.29
(Continued)

FOREIGN PATENT DOCUMENTS
JP    8 19890    3/1996
(Continued)

OTHER PUBLICATIONS

Japanese Decision to Grant Patent mailed Sep. 14, 2010 in corresponding Japanese Application No. 2007-153148 (with English translation).

*Primary Examiner* — Freddie Kirkland, III
(74) *Attorney, Agent, or Firm* — Oblon, Spivak, McClelland, Maier & Neustady, L.L.P.

(57) ABSTRACT

An engine ECU executes a program including calculating a correlation coefficient by dividing the sum of respective absolute values, which are each a difference between a magnitude in an engine vibration waveform and a magnitude in a knock waveform model for every crank angle, by an area corresponding to magnitudes equal to or larger than a positive reference value in the knock waveform model, and determining whether or not knocking has occurred based on the correlation coefficient.

15 Claims, 18 Drawing Sheets

U.S. PATENT DOCUMENTS

| | | | |
|---|---|---|---|
| 7,779,673 B2 * | 8/2010 | Kaneko et al. | 73/35.03 |
| 2005/0000272 A1 | 1/2005 | Takemura et al. | |
| 2005/0241369 A1 | 11/2005 | Inoue et al. | |
| 2006/0106523 A1 | 5/2006 | Ancimer | |
| 2006/0136117 A1 | 6/2006 | Kaneko et al. | |
| 2009/0038384 A1 * | 2/2009 | Kaneko et al. | 73/114.07 |
| 2009/0120410 A1 * | 5/2009 | Kaneko et al. | 123/406.38 |
| 2009/0217908 A1 * | 9/2009 | Watanabe et al. | 123/406.37 |
| 2010/0162795 A1 * | 7/2010 | Kaneko et al. | 73/35.09 |
| 2010/0212634 A1 * | 8/2010 | Yoshihara et al. | 123/406.24 |

FOREIGN PATENT DOCUMENTS

| | | |
|---|---|---|
| JP | 2003 21032 | 1/2003 |
| JP | 2004 353531 | 12/2004 |
| JP | 2005-299579 A | 10/2005 |
| JP | 2005 330954 | 12/2005 |

* cited by examiner

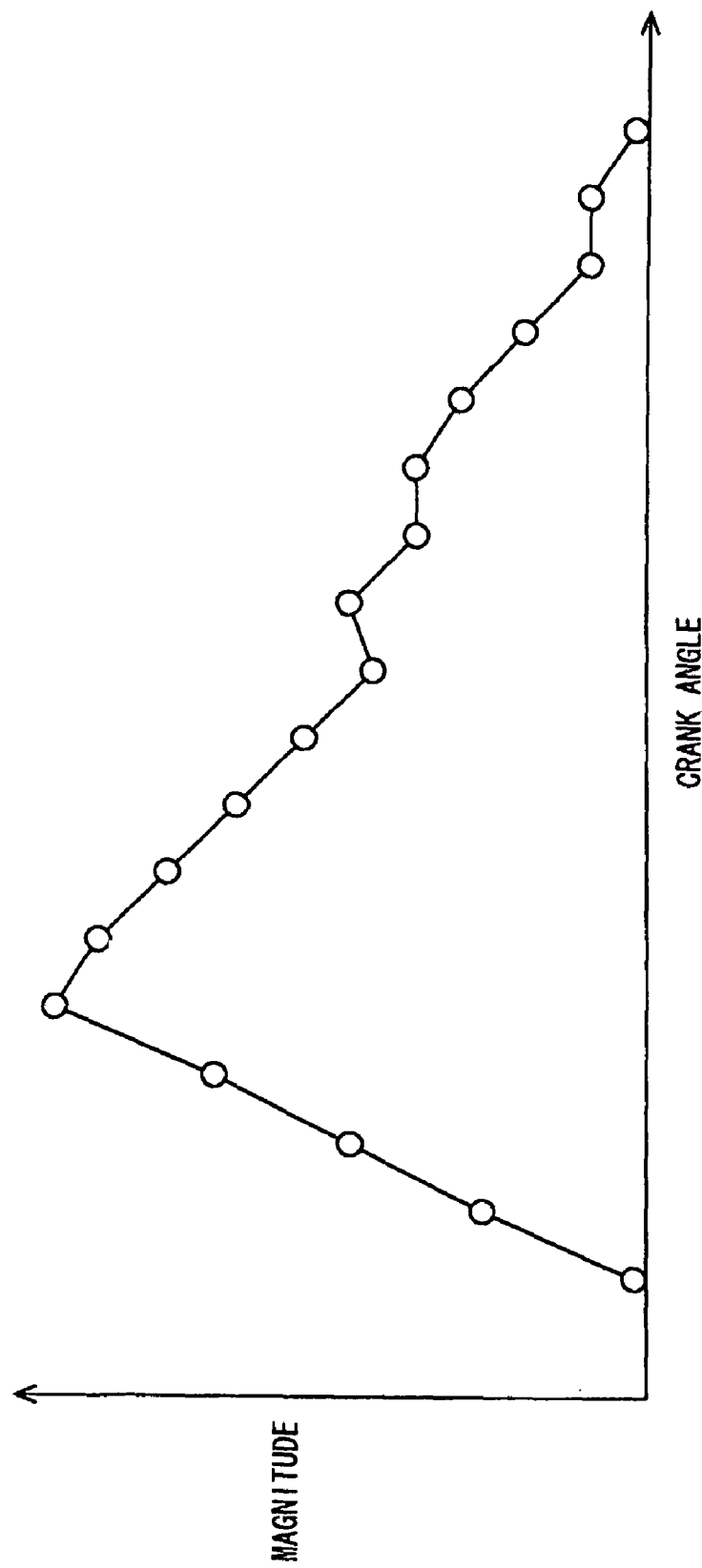
F I G. 4

FIG. 8

|  | A | C | B |
|---|---|---|---|
| KL(2) | | | |
| | B | C | B |
| KL(1) | | | |
| | A | B | A |

INTAKE AIR AMOUNT KL

NE(1)　　NE(2)
ENGINE SPEED NE

US 8,020,429 B2

DEVICE AND METHOD FOR DETERMINING KNOCKING OF INTERNAL COMBUSTION ENGINE

TECHNICAL FIELD

The present invention relates to a device and a method for determining knocking of an internal combustion engine, and particularly to a technique of determining whether knocking has occurred or not based on a waveform of vibration of the internal combustion engine.

BACKGROUND ART

Various methods for detecting knocking (knock) occurring in an internal combustion engine have been proposed. For example, a technique determines that knocking has occurred when the magnitude of vibration of the internal combustion engine is larger than a threshold value. There is a case, however, where the magnitude of such noise as vibration which occurs when an intake valve or an exhaust valve for example closes is larger than the threshold value while knocking does not occur. In this case, although knocking has not occurred, it could be erroneously determined that knocking has occurred. Accordingly, a technique has been proposed that determines whether knocking has occurred or not based on the waveform of vibration for considering such characteristics other than the magnitude as the crank angle at which vibration occurs and the damping rate.

Japanese Patent Laying-Open No. 2005-330954 discloses a knocking determination device for an internal combustion engine that uses the waveform of vibration to precisely determine whether or not knocking has occurred. The knocking determination device disclosed in Japanese Patent Laying-Open No. 2005-330954 includes a crank angle detection unit for detecting a crank angle of the internal combustion engine, a vibration detection unit for detecting a value relevant to the magnitude of vibration of the internal combustion engine, a waveform detection unit for detecting a waveform of vibration of the internal combustion engine in a predetermined range of crank angle, based on a value determined by dividing the value relevant to the magnitude of vibration by a maximum one of the detected values relevant to the magnitude of vibration, a storage unit for storing in advance a waveform of vibration of the internal combustion engine, and a determination unit for determining whether or not knocking has occurred in the internal combustion engine, based on a result of comparison between the detected waveform and the stored waveform. The determination unit determines whether or not knocking has occurred based on a value representing a deviation of the detected waveform from the stored waveform. The value representing the deviation is calculated by dividing the sum of differences which are each a difference between a magnitude in the detected waveform and a magnitude in the stored waveform determined for each crank angle, by a value determined by integrating the magnitude in the stored waveform by the crank angle.

Regarding the knocking determination device disclosed in the above-referenced publication, the crank angle detection unit detects the crank angle of the internal combustion engine, the vibration detection units detects a value relevant to the magnitude of vibration, the waveform detection unit detects the waveform of vibration of the internal combustion engine in a predetermined range of crank angle, based on the value relevant to the magnitude (intensity) of vibration. The storage unit stores in advance the waveform of vibration of the internal combustion engine, and the determination unit determines whether knocking has occurred or not in the internal combustion engine, based on the result of comparison between the detected waveform and the stored waveform. Thus, a knock waveform model, which is a waveform of vibration when knocking occurs, is prepared through experiments or the like for example and stored in advance, and the knock waveform model and the detected waveform are compared with each other. In this way, whether or not knocking has occurred can be determined. Accordingly, whether or not any vibration of the engine is vibration due to knocking can be analyzed in more detail. Further, based on the magnitude of vibration in addition to the waveform of vibration, whether or not knocking has occurred is determined. Consequently, it can be determined precisely whether or not knocking has occurred.

The knocking determination device disclosed in Japanese Patent Laying-Open No. 2005-330954, however, detects a waveform that is normalized by dividing the value relevant to the magnitude of vibration by its maximum value. Therefore, regardless of whether the detected magnitude is large or small, the maximum magnitude of the detected waveform is "1" all the time. Thus, even if the original magnitude before being divided by the maximum value is small, the value representing the deviation of the waveform is likely to be a value which seems to represent knocking if the shape of the detected waveform is similar to the shape of the stored waveform. This is for the following reason. The value determined by integrating the magnitude in the stored waveform by the crank angle, namely the area of the stored waveform is relatively larger than the difference between the magnitude of the detected waveform and the magnitude of the stored waveform, and thus the influence of the difference between the magnitude of the detected waveform and the magnitude of the stored waveform is relatively small. Then, it could be erroneously determined that knocking has occurred, despite that knocking does not occur.

DISCLOSURE OF THE INVENTION

An object of the present invention is to provide a device and the like for determining knocking of an internal combustion engine, capable of precisely determining whether or not knocking has occurred.

According to an aspect of the present invention, a device for determining knocking of an internal combustion engine includes: a crank position sensor detecting a crank angle of the internal combustion engine; a knock sensor detecting a magnitude of vibration of the internal combustion engine in association with the crank angle; and an operation unit. The operation unit detects a waveform of vibration in a predetermined interval of crank angle, based on the magnitude of vibration of the internal combustion engine, calculates a first value based on a difference between a magnitude in the detected waveform and a magnitude in a waveform model that is predetermined as a reference of the waveform of vibration of the internal combustion engine, calculates a second value based on one of a value determined by subtracting a positive reference value from the magnitude in the waveform model and a value determined by subtracting the reference value from the magnitude in the detected waveform, calculates a third value based on the first value and the second value, and determines whether or not knocking has occurred in the internal combustion engine based on the third value.

With this configuration, the crank angle of the internal combustion engine is detected. The magnitude of vibration of the internal combustion engine is detected in association with the crank angle. The waveform of vibration in a predetermined interval of crank angle is detected. The first value is calculated based on the difference between the magnitude in the detected waveform and the magnitude in the waveform model which is predetermined as a reference of the waveform of vibration of the internal combustion engine. In this way, the difference between the magnitude in the detected waveform and the magnitude in the waveform model can be numerically represented. Further, the second value is calculated based on one of the value determined by subtracting a positive reference value from the magnitude in the waveform model and the value determined by subtracting the reference value from the magnitude in the detected waveform. In this way, the second value can be obtained with an influence reduced, by the reference value, of the magnitude in the waveform model or the magnitude in the detected waveform. The third value is calculated based on the first value and the second value. In this way, the third value can be obtained with an influence reduced by the reference value of the magnitude itself in the waveform model or the magnitude itself in the detected waveform, while the difference between the magnitude in the detected waveform and the magnitude in the waveform model is still taken into consideration. Therefore, the influence can be relatively increased of the difference between the magnitude in the detected waveform and the magnitude in the waveform model on the third value. Accordingly, even if the difference between the magnitude in the detected waveform and the magnitude in the waveform model is small, the difference between the magnitude in the detected waveform and the magnitude in the waveform model can be reflected greatly in the third value. Based on the third value, whether or not knocking has occurred in the internal combustion engine is determined. In this way, in the case where the difference between the magnitude in the detected waveform and the magnitude in the waveform model is small while knocking has not occurred, occurrence of erroneous determination that knocking has occurred can be reduced. Therefore, the device for determining knocking of the internal combustion engine can be provided that is capable of precisely determining whether or not knocking has occurred.

Preferably, the operation unit calculates the first value that is smaller as the difference between the magnitude in the detected waveform and the magnitude in the waveform model is smaller. The operation unit calculates the second value that is smaller as one of the value determined by subtracting the reference value from the magnitude in the waveform model and the value determined by subtracting the reference value from the magnitude in the detected waveform is smaller. The operation unit calculates the third value that is smaller as the first value is smaller and that is larger as the second value is smaller. The operation unit determines that knocking has occurred in the internal combustion engine when the third value is smaller than a predetermined value.

With this configuration, the first value is calculated so that the first value is smaller as the difference between the magnitude in the detected waveform and the magnitude in the waveform model is smaller. The second value is calculated so that the second value is smaller as one of the value determined by subtracting a reference value from the magnitude in the waveform model and the value determined by subtracting the reference value from the magnitude in the detected waveform is smaller. The third value is calculated so that the third value is smaller as the first value is smaller and larger as the second value is smaller. When the third value is smaller than a predetermined value, it is determined that knocking has occurred in the internal combustion engine. In this way, based on the balance between the difference between the detected waveform and the waveform model and the difference between the magnitude in the waveform model and the reference value, or the balance between the difference between the detected waveform and the waveform model and the difference between the magnitude in the detected waveform and the reference value, whether or not knocking has occurred can be determined. Therefore, in the case where the difference between the detected waveform and the waveform model is small while it seems that knocking has not occurred in view of the difference between the magnitude in the waveform model and the reference value or the difference between the magnitude in the detected waveform and the reference value, the determination that knocking has not occurred can be made. Accordingly, occurrence can be reduced of erroneous determination that knocking has occurred despite that knocking has not occurred.

Still preferably, the operation unit calculates the first value by summing differences that are each a difference between a magnitude in the detected waveform and a magnitude in the waveform model for every predetermined crank angle.

With this configuration, the first value can be obtained by summing respective differences that are each the difference between the magnitude in the detected waveform and the magnitude in the waveform model for every crank angle.

Still preferably, the second value calculated by the operation unit is one of a value determined by summing a plurality of values that are each obtained by subtracting the reference value from a magnitude in the waveform model for every predetermined crank angle, and a value determined by dividing, by a coefficient, a value obtained by subtracting the reference value from a maximum value of magnitude in the detected waveform.

With this configuration, one of the following values can be calculated as the second value, namely the value determined by summing a plurality of values that are each obtained by subtracting the reference value from a magnitude in the waveform model for every predetermined crank angle, and a value determined by dividing, by a coefficient, a value obtained by subtracting the reference value from a maximum value of magnitude in the detected waveform.

Still preferably, the operation unit calculates the third value by dividing the first value by the second value.

With this configuration, the third value can be calculated by dividing the first value by the second value.

Still preferably, the reference value is a minimum value of magnitude in the detected waveform in a range of crank angle for which the difference between the magnitude in the detected waveform and the magnitude in the waveform model is calculated.

With this configuration, the reference value to be used is the minimum value of magnitude in the detected waveform in a range of crank angle for which the difference between the magnitude in the detected waveform and the magnitude in the waveform model is calculated. In this way, the reference value according to vibration actually generated in the internal combustion engine can be obtained. Therefore, the reference value according to the individual internal combustion engine and the operating state of the engine can be obtained.

Still preferably, the reference value is a minimum value of magnitude in the detected waveform.

With this configuration, the minimum magnitude in the detected waveform is used as the reference value. In this way, the reference value according to vibration actually generated in the internal combustion engine can be obtained. Therefore, the reference value according to the individual internal combustion engine and the operating state of the engine can be obtained.

Still preferably, the operation unit sets the reference value by smoothing respective minimum values of magnitude in respective waveforms detected in a plurality of ignition cycles.

With this configuration, respective minimum magnitudes in respective waveforms detected in a plurality of ignition cycles are smoothed to set the reference value. In this way, the reference value according to vibration actually generated in the internal combustion engine can be obtained. Therefore, the reference value according to the individual internal combustion engine and the operating state of the engine can be obtained.

Still preferably, the operation unit sets the reference value by smoothing so that, in a case where a minimum value of magnitude in a latter ignition cycle is larger than a minimum value of magnitude in a former ignition cycle, the minimum value of magnitude in the latter ignition cycle has a smaller influence as compared with a case where the minimum value of magnitude in the latter ignition cycle is smaller than the minimum value of magnitude in the former ignition cycle.

With this configuration, in the case where the minimum magnitude in the latter ignition cycle is larger than the minimum magnitude in the former ignition cycle, the reference value is set by smoothing so that an influence of the minimum magnitude in the latter ignition cycle is smaller as compared with the case where the minimum magnitude in the latter ignition cycle is smaller than the minimum magnitude in the former ignition cycle. In this way, the reference value can be prevented from being too large. Therefore, even if large mechanical vibration is generated for example due to a high output-shaft speed of the internal combustion engine, the reference value can be prevented from being unnecessarily large.

According to another aspect of the present invention, a device for determining knocking of an internal combustion engine includes: a crank position sensor detecting a crank angle of the internal combustion engine; a knock sensor detecting a magnitude of vibration of the internal combustion engine in association with the crank angle; and an operation unit. The operation unit detects a waveform of vibration in a predetermined interval of crank angle, based on the magnitude of vibration of the internal combustion engine, sets a magnitude in a waveform model that is a reference of the waveform of vibration of the internal combustion engine, based on respective magnitudes in respective waveforms detected in a plurality of ignition cycles, calculates a first value based on a difference between a magnitude in the detected waveform and a magnitude in the waveform model, calculates a second value based on the magnitude in the waveform model, calculates a third value based on the first value and the second value, and determines whether or not knocking has occurred in the internal combustion engine based on the third value.

With this configuration, the crank angle of the internal combustion engine is detected, and the magnitude of vibration of the internal combustion engine is detected in association with the crank angle. Based on the magnitude of vibration, the waveform of vibration in a predetermined interval of crank angle is detected. The magnitude in the waveform model, which is a reference of the waveform of vibration of the internal combustion engine, is set based on respective magnitudes in respective waveforms that are detected in a plurality of ignition cycles. In this way, when previously detected magnitudes in respective waveforms are analyzed and accordingly one of the magnitudes can be regarded as a magnitude of vibration which has occurred due to knocking, for example, the magnitude can be set to the maximum value of magnitude in the waveform model. Therefore, in the case where the maximum magnitude in the detected waveform is small, the difference between the magnitude of the detected waveform and the magnitude in the waveform model can be made larger. The obtained waveform model and the detected waveform are compared with each other. Based on the difference between the magnitude in the detected waveform and the magnitude in the waveform model, the first value is calculated. Further, based on the magnitude in the waveform model, the second value is calculated. Furthermore, based on these first value and second value, the third value is calculated. In this way, in the case where the maximum magnitude in the detected waveform is small, the third value can be obtained that is greatly influenced by the difference between the detected waveform and the waveform model. Based on the third value, whether or not knocking has occurred in the internal combustion engine is determined. In this way, occurrence of erroneous determination that knocking has occurred despite that knocking has not occurred, can be reduced. Therefore, the device for determining knocking of the internal combustion engine capable of precisely determining whether or not knocking has occurred can be provided.

Preferably, the operation unit sets a maximum value of magnitude in the waveform model, based on respective maximum values of magnitude in respective waveforms detected in the plurality of ignition cycles.

With this configuration, based on respective maximum magnitudes in respective waveforms detected in a plurality of ignition cycles, the maximum value of magnitude in the waveform model is set. In this way, from respective maximum magnitudes of respective waveforms that were previously detected, any magnitude that seems to be a magnitude of vibration caused by knocking can be set to the maximum value, of magnitude in the waveform model. Therefore, in such a case where the maximum magnitude in the detected waveform is small, a difference can be identified clearly between the magnitude in the detected waveform and the magnitude in the waveform model.

Still preferably, the operation unit sets the maximum value of magnitude in the waveform model to a value determined by adding a product of a standard deviation of the maximum values and a coefficient to a median value of the maximum values.

With this configuration, the value determined by adding the product of the standard deviation of the maximum values and a coefficient to the median value of the maximum values is set to the maximum value of magnitude in the waveform model. This is for the reason that the value determined by adding the product of the standard deviation of the maximum values and a coefficient to the median value of the maximum values can be regarded as a magnitude of vibration caused by knocking. In this way, in such a case where the maximum magnitude in the detected waveform is small, a difference can be identified clearly between the magnitude in the detected waveform and the magnitude in the waveform model.

Still preferably, the operation unit calculates the first value by summing differences that are each a difference between a magnitude in the detected waveform and a magnitude in the waveform model, calculates the second value by summing magnitudes in the waveform model, calculates the third value by dividing the first value by the second value, and determines that knocking has occurred in the internal combustion engine when the third value is smaller than a predetermined value.

With this configuration, the first value is calculated by summing differences that are each a difference between the magnitude in the detected waveform and the magnitude in the waveform model. The second value is calculated by summing magnitudes in the waveform model. The third value is calculated by dividing the first value by the second value. When the third value is smaller than a predetermined value, it is determined that knocking has occurred in the internal combustion engine. In this way, whether or not knocking has occurred can be determined based on the ratio between the sum of differences each between the magnitude in the detected waveform and the magnitude in the waveform model, and the sum of magnitudes in the waveform model. Therefore, in such a case where the difference between the magnitude in the detected waveform and the magnitude in the waveform model is small while it seems that knocking has not occurred in view of the magnitude in the waveform model, it can correctly be determined that knocking has not occurred. On the contrary, in such a case where the difference between the magnitude in the detected waveform and the magnitude in the waveform model is large while it seems that knocking has occurred in view of the magnitude in the waveform model, it can be determined correctly that knocking has occurred. Thus, erroneous determination can be reduced.

According to still another aspect of the present invention, a device for determining knocking of an internal combustion engine includes: a crank position sensor detecting a crank angle of the internal combustion engine; a knock sensor detecting a magnitude of vibration of the internal combustion engine in association with the crank angle; and an operation unit. The operation unit detects a waveform of vibration in a first interval of crank angle, based on the magnitude of vibration of the internal combustion engine, sets a second interval of crank angle according to an operating state of the internal combustion engine, calculates a first value based on a difference, in the second interval, between a magnitude in the detected waveform and a magnitude in a waveform model that is predetermined as a reference of the waveform of vibration of the internal combustion engine, calculates a second value based on the magnitude in the waveform model in the second interval, calculates a third value based on the first value and the second value, and determines whether or not knocking has occurred in the internal combustion engine based on the third value.

With this configuration, the crank angle of the internal combustion engine is detected, and the magnitude of vibration of the internal combustion engine is detected in association with the crank angle. Based on the magnitude of vibration, the waveform of vibration in the first interval of crank angle is detected. The second interval of crank angle is set according to the operating state of the internal combustion engine. For example, the second interval is set to an interval in which a difference can be identified clearly between the magnitude (shape) of waveform caused by knocking and the magnitude of waveform caused by mechanical vibration or the like of the internal combustion engine. The first value is calculated based on the difference, in the second interval, between the magnitude in the detected waveform and the magnitude in the waveform model which is predetermined as a reference waveform of vibration of the internal combustion engine. In this way, the first value can be obtained in which a difference is clearly reflected between the magnitude of waveform due to knocking and the magnitude of waveform due to mechanical vibration or the like of the internal combustion engine. Further, based on the magnitude in the waveform model in the second-interval, the second value is calculated. Based on the first value and second value, the third value is calculated. In this way, the third value can be obtained in which a difference is clearly reflected between the magnitude of waveform due to knocking and the magnitude of waveform due to mechanical vibration or the like of the internal combustion engine. Based on the third value, it is determined whether or not knocking has occurred in the internal combustion engine. In this way, occurrence of erroneous determination that knocking has occurred despite that knocking has not occurred can be reduced. Therefore, the device for determining knocking of an internal combustion engine that is capable of precisely determining whether or not knocking has occurred can be provided.

Preferably, the operation unit sets the second interval based on at least one of the number of rotations of an output shaft and load of the internal combustion engine.

With this configuration, the second interval is set according to at least one of the number of rotations of the output shaft of the internal combustion engine and the load thereof having a large influence on the magnitude (shape) of the detected waveform. In this way, the second interval can be set to an interval in which a difference is clearly identified between the magnitude of waveform due to knocking and the magnitude of waveform due to mechanical vibration or the like of the internal combustion engine.

Still preferably, the operation unit calculates the first value by summing differences in the second interval that are each a difference between a magnitude in the detected waveform and a magnitude in the waveform model, calculates the second value by summing magnitudes in the waveform model in the second interval, calculates the third value by dividing the first value by the second value, and determines that knocking has occurred in the internal combustion engine when the third value is smaller than a predetermined value.

With this configuration, the first value is calculated by summing respective differences in the second interval that are each the difference between the magnitude in the detected waveform and the magnitude in the waveform model. The second value is calculated by summing magnitudes in the waveform model in the second interval. The third value is calculated by dividing the first value by the second value. When the third value is smaller than a predetermined value, it is determined that knocking has occurred in the internal combustion engine. In this way, whether or not knocking has occurred can be determined based on the ratio between the sum of differences each between the magnitude in the detected waveform and the magnitude in the waveform model, and the sum of magnitudes in the waveform model. Therefore, in such a case where the difference between the magnitude in the detected waveform and the magnitude in the waveform model is small while it seems that knocking has not occurred in view of the magnitude in the waveform model, it can correctly be determined that knocking has not occurred. On the contrary, in such a case where the difference between the magnitude in the detected waveform and the magnitude in the waveform model is large while it seems that knocking has occurred in view of the magnitude in the waveform model, it can be determined correctly that knocking has occurred. Thus, erroneous determination can be reduced.

According to a further aspect of the present invention, a device for determining knocking of an internal combustion engine includes: a crank position sensor detecting a crank angle of the internal combustion engine; a knock sensor detecting a magnitude of vibration of the internal combustion engine in association with the crank angle; and an operation unit. The operation unit detects a waveform of vibration in a predetermined interval of crank angle, based on a magnitude obtained by subtracting a positive reference value from the magnitude of vibration of the internal combustion engine, calculates a first value based on a difference between a magnitude in the detected waveform and a magnitude in a waveform model that is predetermined as a reference of the waveform of vibration of the internal combustion engine, calculates a second value based on the magnitude in the waveform model, calculates a third value based on the first value and the second value, and determines whether or not knocking has occurred in the internal combustion engine based on the third value.

With this configuration, the crank angle of the internal combustion engine is detected, and the magnitude of vibration of the internal combustion engine is detected in association with the crank angle. Based on a magnitude obtained by subtracting a positive reference value from the magnitude of vibration, the waveform of vibration in a predetermined interval of crank angle is detected. The first value is calculated based on the difference between the magnitude in the waveform and the magnitude in the waveform model predetermined as a reference of waveform of vibration of the internal combustion engine. Further, the second value is calculated based on the magnitude in the waveform model. The third value is calculated based on the first value and the second value. Here, when the waveform is detected, the difference between the magnitude in the detected waveform and the magnitude in the waveform model is likely to be large, since the magnitude is reduced by the reference value. Therefore, the third value can be obtained in which a difference is clearly reflected between the magnitude in the detected waveform and the magnitude in the waveform model. Based on the third value, whether or not knocking has occurred in the internal combustion engine is determined. In this way, in such a case where the shape of the detected waveform is similar to the shape of the waveform model while the magnitudes are different, it can be determined that knocking has not occurred. Therefore, the erroneous determination that knocking has occurred despite that knocking has not occurred can be reduced. Accordingly, the device for determining knocking of the internal combustion engine can be provided that can precisely determine whether or not knocking has occurred.

Preferably, the operation unit calculates the first value by summing differences that are each a difference between a magnitude in the detected waveform and a magnitude in the waveform model, calculates the second value by summing magnitudes in the waveform model, calculates the third value by dividing the first value by the second value, and determines that knocking has occurred in the internal combustion engine when the third value is smaller than a predetermined value.

With this configuration, the first value is calculated by summing differences that are each a difference between the magnitude in the detected waveform and the magnitude in the waveform model. The second value is calculated by summing magnitudes in the waveform model. The third value is calculated by dividing the first value by the second value. When the third value is smaller than a predetermined value, it is determined that knocking has occurred in the internal combustion engine. In this way, whether or not knocking has occurred can be determined based on the ratio between the sum of differences each between the magnitude in the detected waveform and the magnitude in the waveform model, and the sum of magnitudes in the waveform model. Therefore, in such a case where the difference between the magnitude in the detected waveform and the magnitude in the waveform model is small while it seems that knocking has not occurred in view of the magnitude in the waveform model, it can correctly be determined that knocking has not occurred. On the contrary, in such a case where the difference between the magnitude in the detected waveform and the magnitude in the waveform model is large while it seems that knocking has occurred in view of the magnitude in the waveform model, it can be determined correctly that knocking has occurred. Thus, erroneous determination can be reduced.

BRIEF DESCRIPTION OF THE DRAWINGS

FIG. 4 is a (first) chart showing a vibration waveform of the engine.

FIG. 8 shows a map of a determination value V(KX) stored in the ROM of the engine ECU.

BEST MODES FOR CARRYING OUT THE INVENTION

Figure 1:
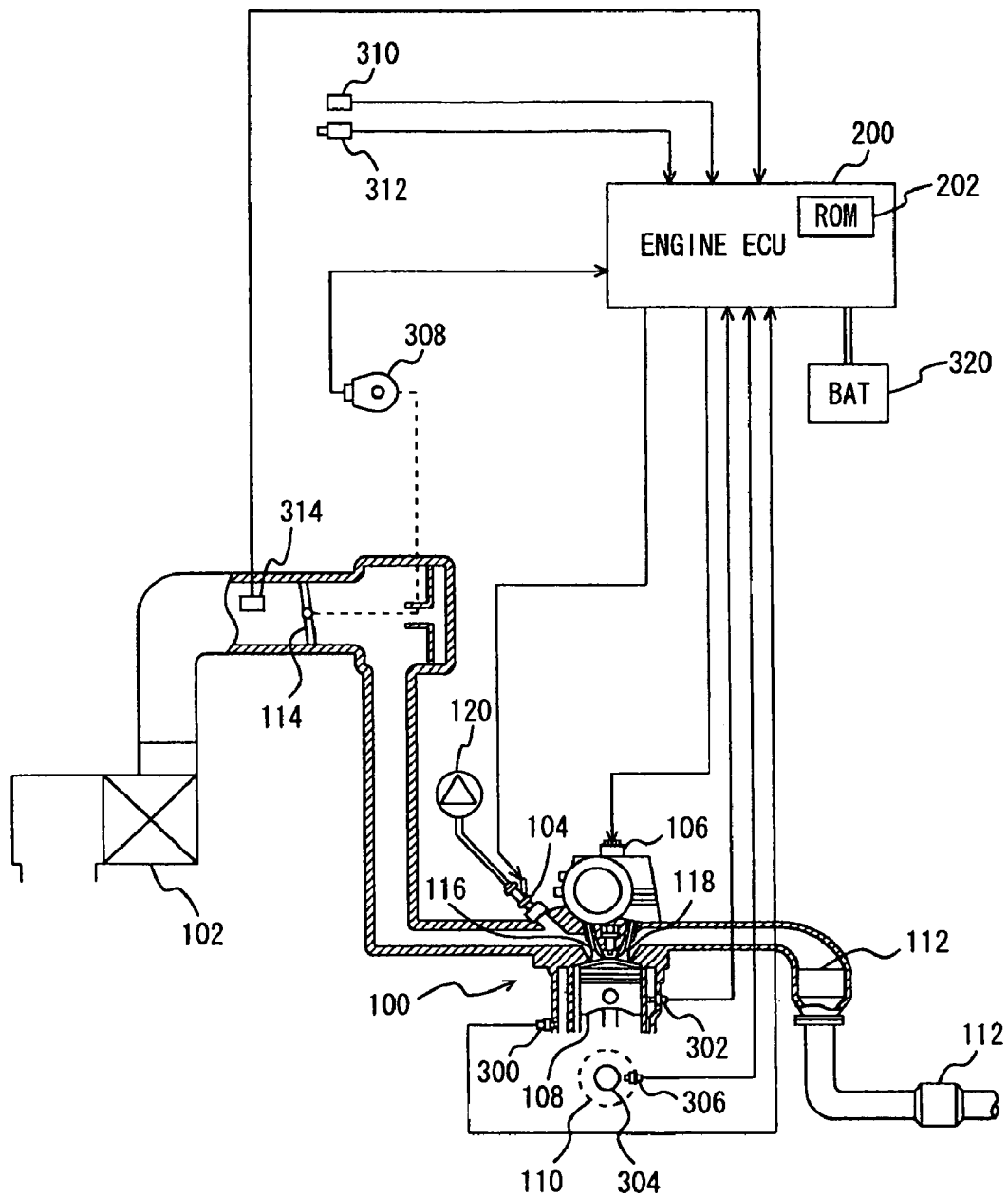
FIG. 1 is a schematic configuration diagram showing an engine controlled by an engine ECU that is a knocking determination device according to a first embodiment of the present invention.

In the following, embodiments of the present invention will be described with reference to the drawings. In the following description, like components are denoted by like reference characters. They are named and function identically as well. Therefore, a detailed description thereof will not be repeated.

First Embodiment

With reference to FIG. 1, an engine 100 of a vehicle mounted with a knocking determination device according to a first embodiment of the present invention will be described. Engine 100 is provided with a plurality of cylinders. The knocking determination device according to the embodiment is accomplished by a program executed by an engine ECU (Electronic Control Unit) 200 for example. The program executed by engine ECU 200 may be recorded on such a recording medium as CD (Compact Disc) or DVD (Digital Versatile Disc) to be distributed on the market.

Engine 100 is an internal combustion engine in which an air-fuel mixture of air drawn in from an air cleaner 102 and fuel injected from an injector 104 is ignited by a spark plug 106 and burnt in a combustion chamber. While the ignition timing is controlled to be MBT (Minimum advance for Best Torque) at which output torque becomes the maximum, the ignition timing is retarded or advanced according to an operation state of engine 100, for example, when knocking occurs.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. The amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 for an opening position of the throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates a voltage in response to vibration of engine 100. The magnitude of the voltage corresponds to the magnitude of the vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates together with crankshaft 110. On the outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, the magnetic flux passing through a coil portion of crank position sensor 306 increases/decreases to generate electromotive force in the coil portion. Crank position sensor 306 sends a signal representing the electromotive force to engine ECU 200. Engine ECU 200 detects the crank angle and the number of rotations of crankshaft 110 based on the signal sent from crank position sensor 306.

Sensor 308 for the opening position of the throttle detects an opening position of the throttle and sends a signal representing the detection result to engine ECU 200. Vehicle speed sensor 310 detects the number of rotations of a wheel (not shown) and sends a signal representing the detection result to engine ECU 200. Engine ECU 200 calculates the vehicle speed based on the number of rotations of the wheel. Ignition switch 312 is turned on by a driver when engine 100 is to be started. Air flow meter 314 detects the amount of intake air into engine 100 and sends a signal representing the detection result to engine ECU 200.

Engine ECU 200 is operated by electric power supplied from an auxiliary battery 320 that is a power supply. Engine ECU 200 performs computation based on signals sent from respective sensors and ignition switch 312 as well as a map and a program stored in a ROM (Read-Only Memory) 202, and controls the devices so as to bring engine 100 into a desired operation state.

In the embodiment, engine ECU 200 detects a waveform of vibration (hereafter referred to as "vibration waveform") of engine 100 in a predetermined knock detection gate (a section from a predetermined first crank angle to a predetermined second crank angle), based on the signal sent from knock sensor 300 and the crank angle, and determines whether or not knocking has occurred in engine 100, based on the detected vibration waveform. The knock detection gate in the embodiment is from the top dead center) (0°) to 90° in a combustion stroke. The knock detection gate is not limited to this.

Figure 2:
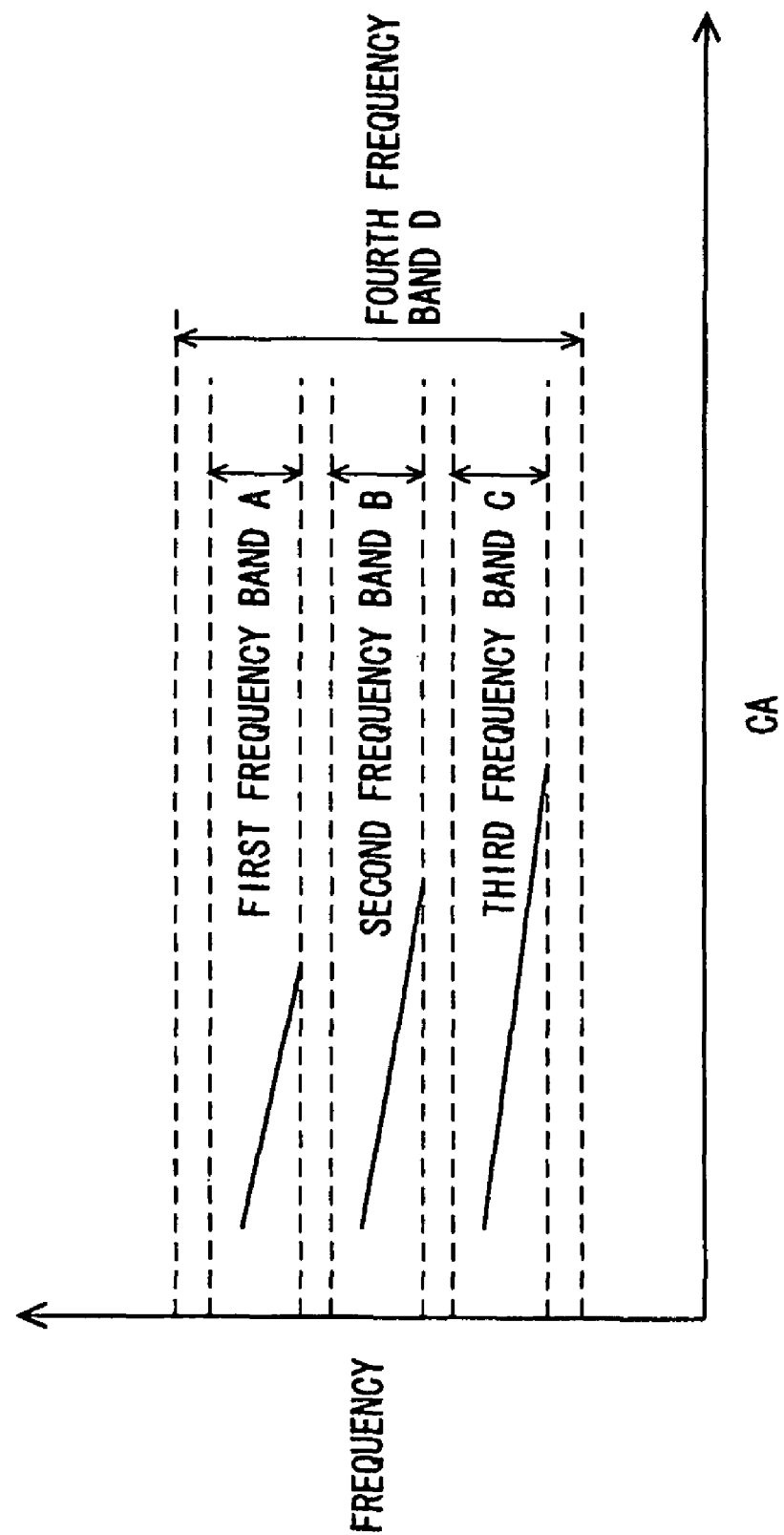
FIG. 2 shows a frequency band of vibration generated in the engine when knocking occurs.

When knocking occurs, vibration at a frequency near the frequency shown by the solid line in FIG. 2 is generated in engine 100. The frequency of vibration generated due to the knocking is not constant but varies in a certain frequency band. Therefore, in the embodiment, as shown in FIG. 2, the vibration in a fourth vibration band D including a first frequency band A, a second frequency band B and a third frequency band C is detected. In FIG. 2, CA represents the crank angle. The number of frequency bands of vibration generated due to the knocking is not restricted to three.

Figure 3:
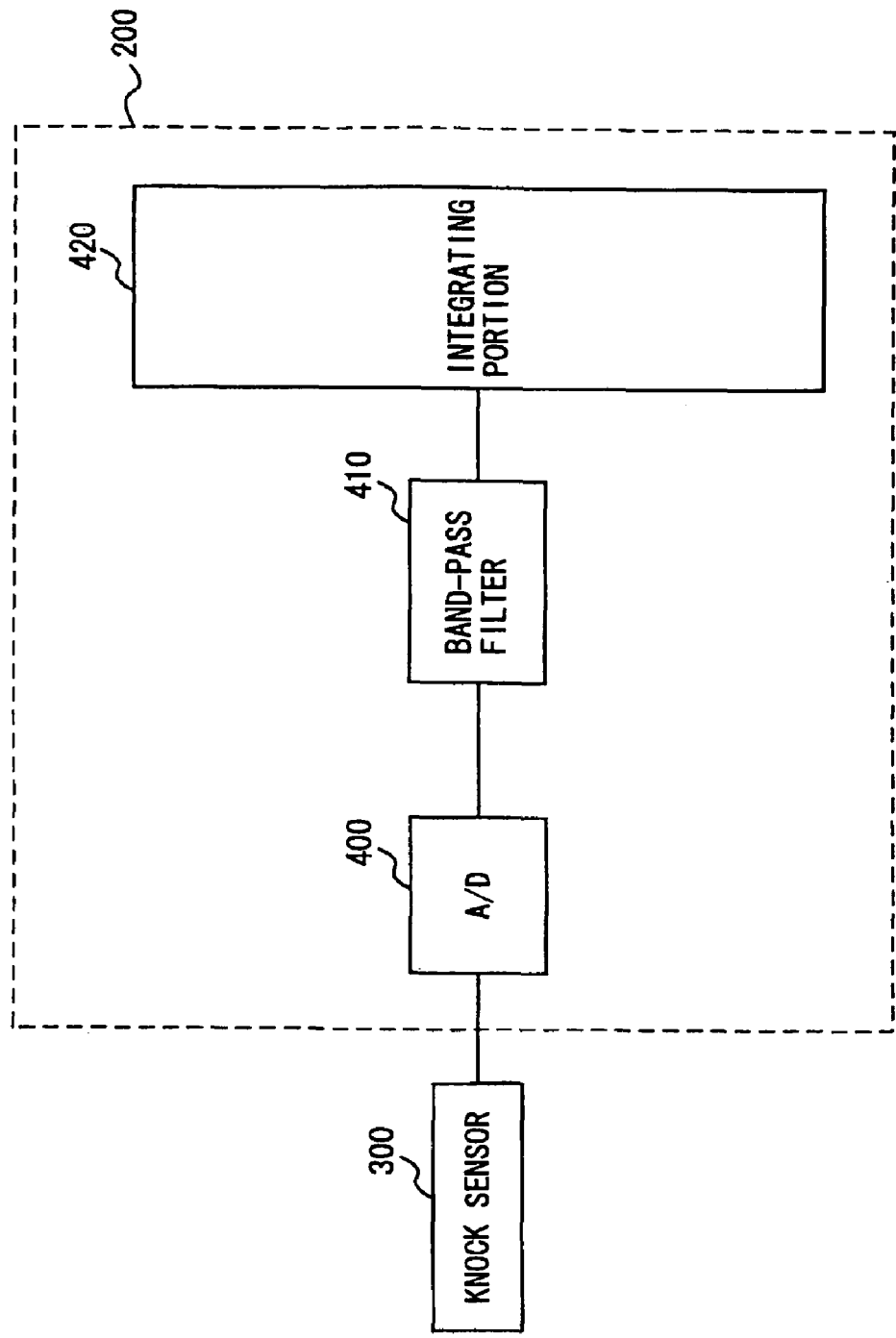
FIG. 3 is a (first) control block diagram showing the engine ECU.

With reference to FIG. 3, engine ECU 200 will be further described. Engine ECU 200 includes an A/D (analog/digital) converter 400, a band-pass filter 410 and an integrating portion 420.

A/D converter 400 converts an analog signal sent from knock sensor 300 into a digital signal. Band-pass filter 410 allows passage of only signals in the fourth frequency band D out of signals sent from knock sensor 300. In other words, band-pass filter 410 extracts only the vibration in the fourth frequency band D from the vibration detected by knock sensor 300.

Integrating portion 420 integrates signals selected by band-pass filter 410, i.e., magnitudes of vibration in a range of crank angle of 5° at a time. The resultant value determined by this integration is hereinafter referred to as integrated value. By calculating the integrated value in association with the crank angle, a vibration waveform of engine 100 is detected as shown in FIG. 4.

Figure 5:
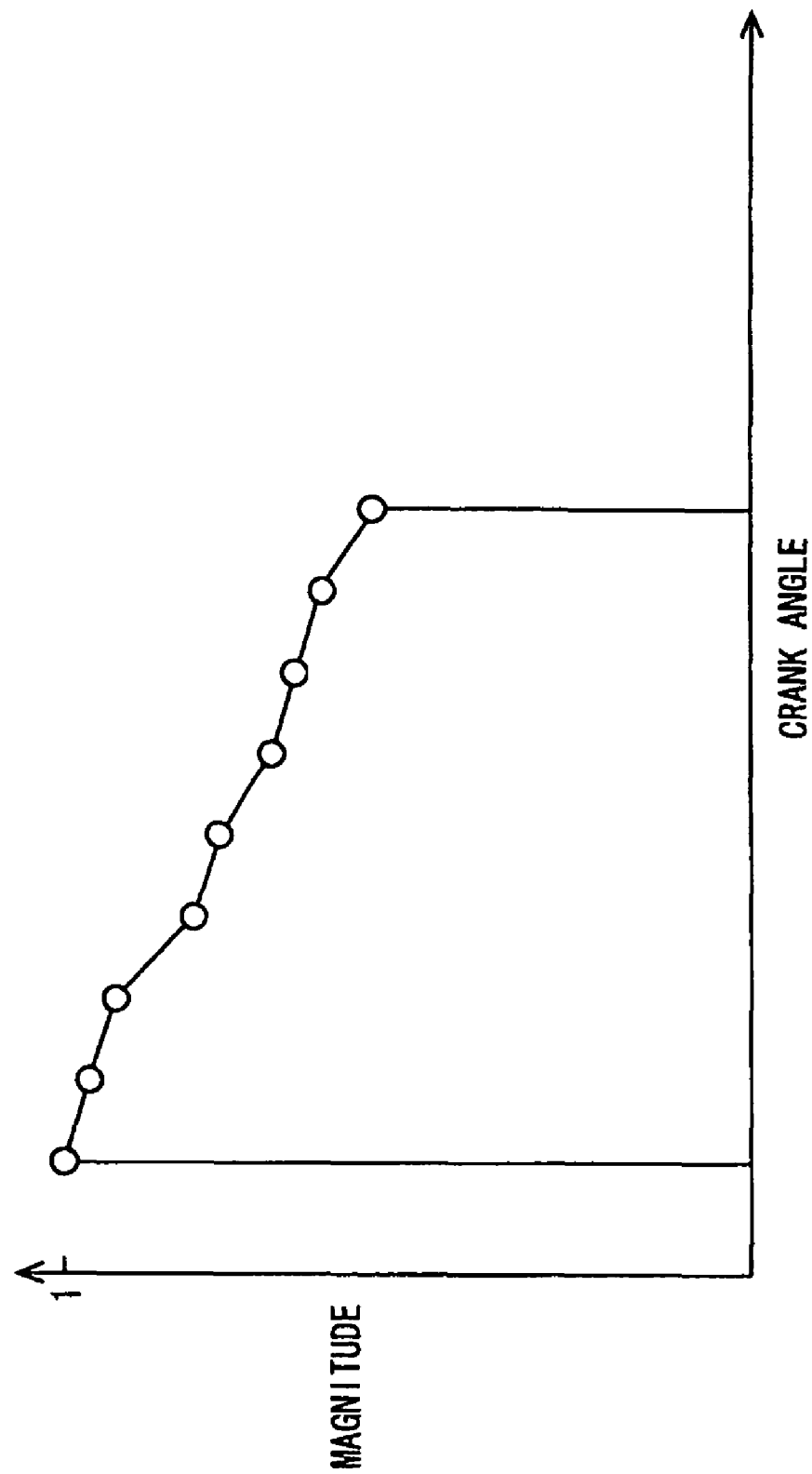
FIG. 5 shows a knock waveform model stored in a ROM of the engine ECU.

The detected vibration waveform is compared with a knock waveform model stored in ROM 202 of engine ECU 200 as shown in FIG. 5. The knock waveform model is formed in advance as a model of the vibration waveform in the case where knocking occurs in engine 100.

In the knock waveform model, the magnitudes of vibration are expressed as dimensionless numbers in a range of 0 to 1 and the magnitude of vibration is not uniquely associated with the crank angle. In other words, for the knock waveform model of the embodiment, while the magnitude of vibration is defined as the one that decreases as the crank angle increases after a peak value of the magnitude of vibration, a specific crank angle at which the magnitude of vibration has the peak value is not defined.

The knock waveform model in the embodiment corresponds to vibration in a predetermined range of crank angle after the magnitude of vibration caused by knocking reaches the peak value. Alternatively, a knock waveform model may be stored that corresponds to the vibration after the rising edge of vibration caused by knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in the case where the knocking is forcibly generated in the median characteristic engine. The method of forming the knock waveform model is not limited to this, and the model may alternatively be formed by simulation.

Figure 6:
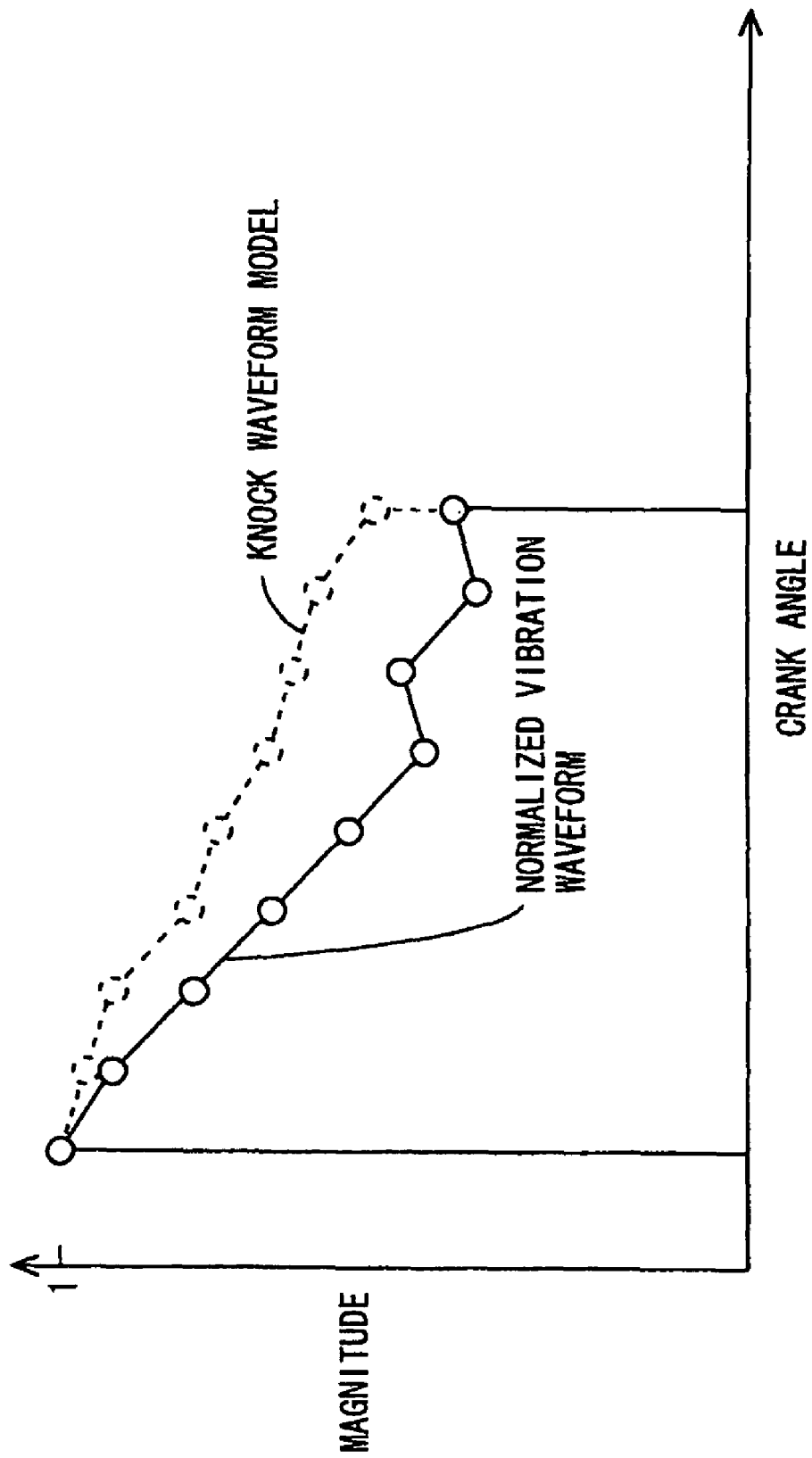
FIG. 6 is a (first) chart showing the vibration waveform and the knock waveform model compared with each other.

When the detected waveform is compared with the knock waveform model, as shown in FIG. 6, the waveform as normalized and the knock waveform model are compared with each other. Here, the normalization means to express the magnitude of vibration as a dimensionless number in a range of 0 to 1 by dividing, for example, each integrated value by the maximum integrated value of the detected vibration waveform. However, the method of normalization is not limited to this.

In the embodiment, engine ECU 200 calculates a correlation coefficient K which represents the degree of similarity of the normalized vibration waveform to the knock waveform model (represents a deviation of the vibration waveform and the knock waveform model from each other). In the state where the timing at which the magnitude of vibration becomes a maximum value in the normalized vibration waveform is synchronized with the timing at which the magnitude of vibration, becomes a maximum value in the knock waveform model, the absolute value of the difference (deviation amount) between the magnitude in the normalized vibration waveform and the magnitude in the knock waveform model is calculated for each crank angle (every 5° of the crank angle) to thereby calculate correlation coefficient K. The absolute value of the difference between the magnitude in the vibration waveform and the magnitude in the knock waveform model may alternatively be calculated for every crank angle other than 5°.

Figure 7:
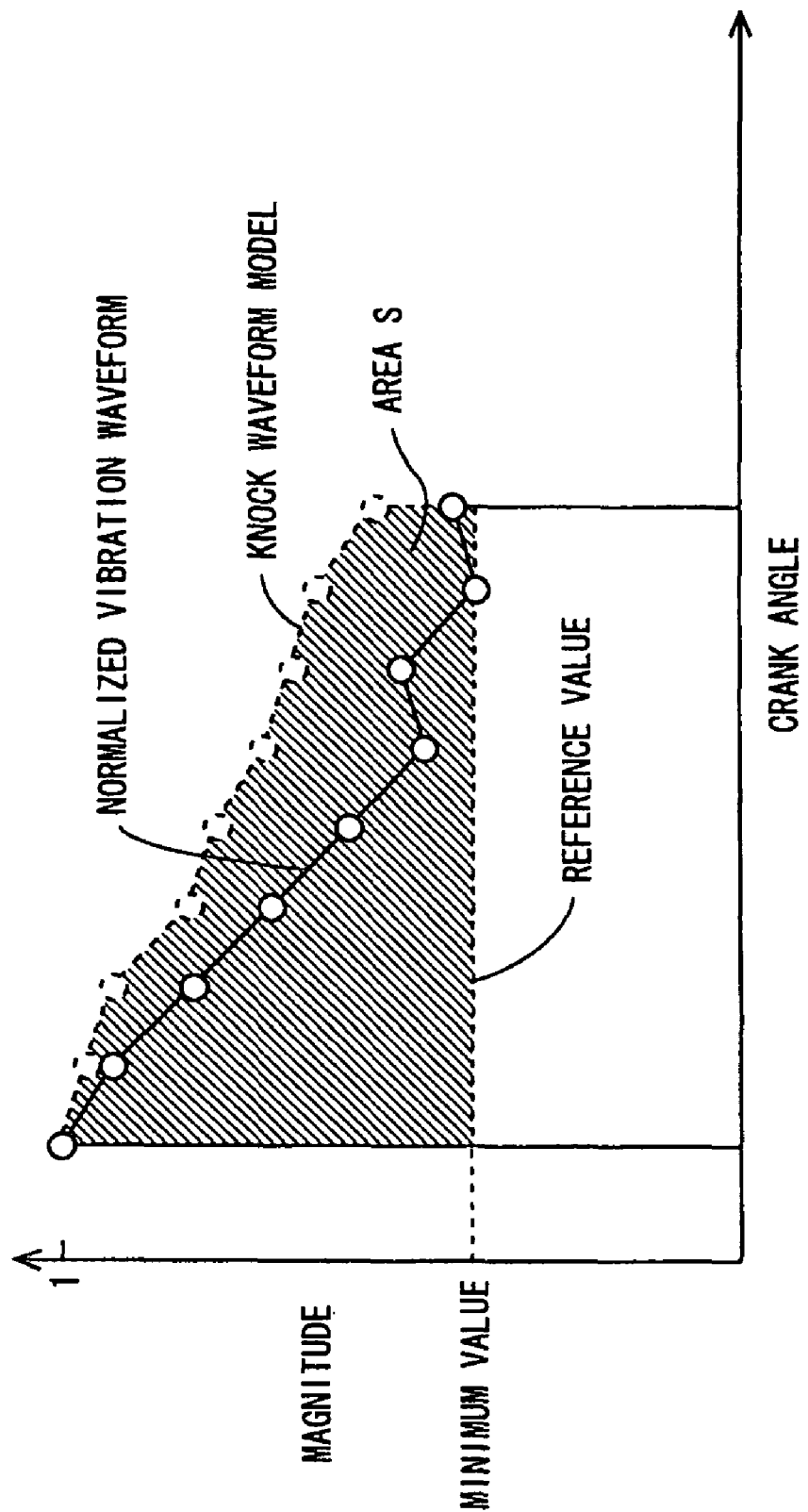
FIG. 7 is a (second) chart showing the vibration waveform and the knock waveform model compared with each other.

It is supposed here that the absolute value of the difference between the magnitude in the normalized vibration waveform and the magnitude in the knock waveform model for each crank angle is ΔS(I) (I is a natural number). As shown by the oblique lines in FIG. 7, it is supposed that the sum of differences which are each a difference between the magnitude of vibration in the knock waveform model and a positive reference value for each crank angle, namely the area of the knock waveform model corresponding to magnitudes equal to or larger than the reference value, is S. Correlation coefficient K is then calculated by the equation:

$$K=(S-\Sigma\Delta S(I))/S \quad (1)$$

where ΣΔS(I) is the total of ΔS(I) for the crank angle at which the vibration waveform and the knock waveform model are compared with each other. As the reference value used for calculating area S of the knock waveform model, the minimum value of the magnitude in the vibration waveform in the range of crank angle for which the difference between the magnitude in the vibration waveform and the magnitude in the knock waveform model is calculated is used. As long as the reference value is a positive value, the minimum value of the magnitude in the detected vibration waveform, namely the minimum value of the magnitude in the knock detection gate, may be used. Alternatively, any value other than the minimum value of the magnitude in the vibration waveform may be used. The method of calculating correlation coefficient K is not limited to this.

Engine ECU 200 further calculates a knock magnitude N that represents the magnitude of vibration, based on the maximum value (peak value) of the integrated values. Supposing that the maximum value of the integrated values is P and a value representing the magnitude of vibration of engine 100 where knocking does not occur is BGL (Back Ground Level), knock magnitude N is calculated by the equation: N=P/BGL. Here, BGL is determined in advance by simulation or experiment for example and stored in ROM 202. The method of calculating knock magnitude N is not limited to this.

In the embodiment, engine ECU 200 compares calculated knock magnitude N and a determination value V(KX) stored in ROM 202 with each other, and further compares the detected waveform and the stored knock waveform model with each other. Then, engine ECU 200 determines, for each ignition cycle, whether or not knocking has occurred in engine 100.

As shown in FIG. 8, determination values V(KX) are stored as a map for respective ranges divided according to an operation state represented by the parameters that are engine speed NE and intake air amount KL. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to this. The ranges may alternatively be divided using parameters other than engine speed NE and intake air amount KL.

Figure 9:
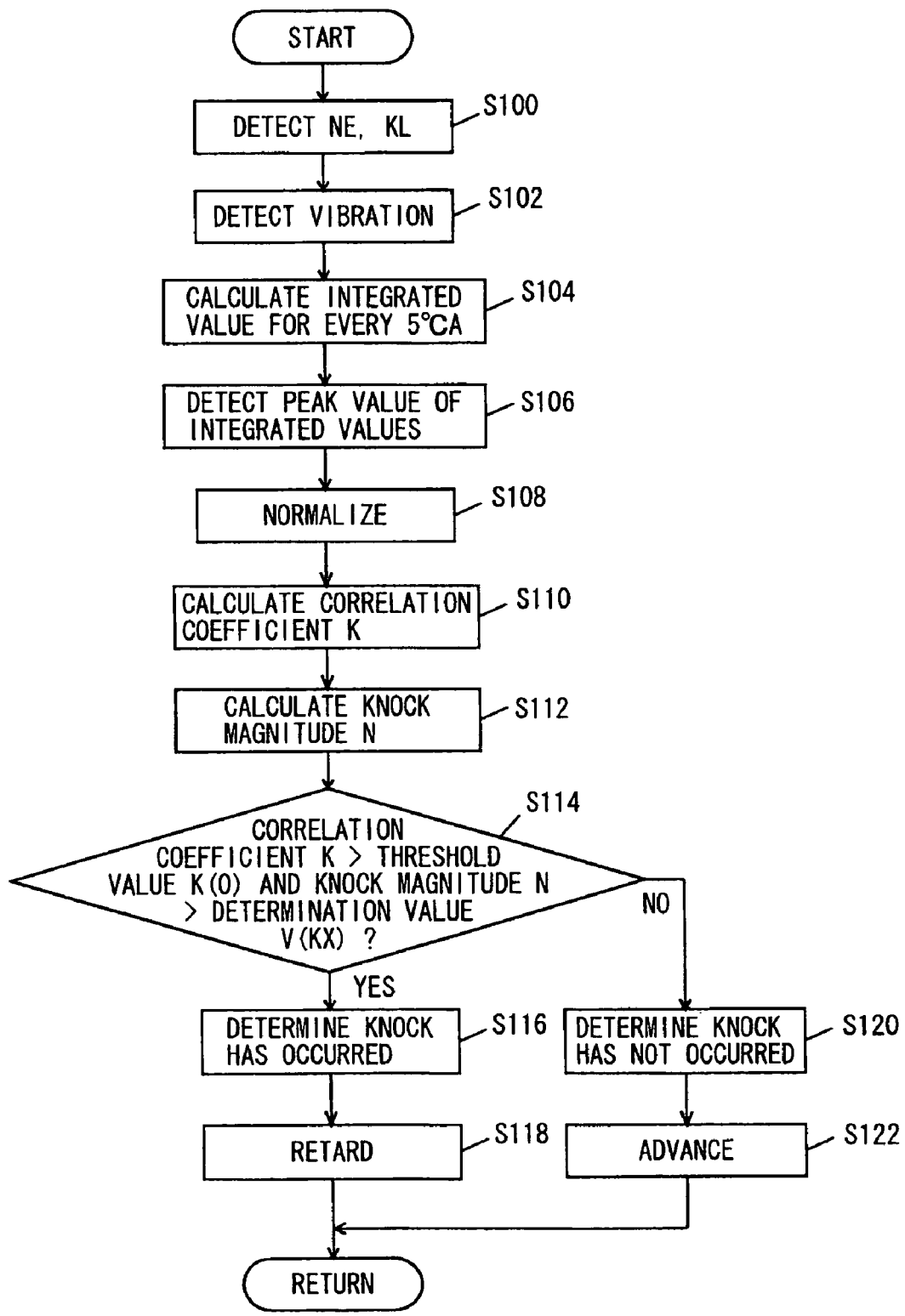
FIG. 9 is a flowchart showing a control structure of a program executed by the engine ECU that is the knocking determination device according to the first embodiment of the present invention.

Referring to FIG. 9, a description will be given of a control structure of a program executed by engine ECU 200 which is the knocking determination device according to the embodiment, in order to determine for each ignition cycle whether or not knocking has occurred, and thereby control the ignition timing.

In step 100 (hereafter "step" will be abbreviated as "S"), engine ECU 200 detects engine speed NE based on a signal sent from crank position sensor 306 and detects intake air amount KL based on a signal sent from air flow meter 314.

In S102, engine ECU 200 detects the magnitude of vibration of engine 100 based on a signal sent from knock sensor 300. The magnitude of vibration is expressed as an output voltage value of knock sensor 300. The magnitude of vibration may be expressed as a value corresponding to the output voltage value of knock sensor 300. The magnitude is detected in the range from the top dead center to 90° (90° in crank angle) in a combustion stroke.

In S104, engine ECU 200 calculates a value (integrated value) by integrating the output voltage values (values representing respective magnitudes of vibration) of knock sensor 300 for every 5° (for 5°) in crank angle. By calculating the integrated values, a vibration waveform of engine 100 is detected.

In S106, engine ECU 200 determines the largest integrated value (peak value P) among integrated values in the vibration waveform of engine 100.

In S108, engine ECU 200 normalizes the vibration waveform of engine 100. Here, the normalization means to express the magnitude of vibration as a dimensionless number in a range of 0 to 1 by dividing, for example, each integrated value by the calculated peak value.

In S110, engine ECU 200 matches the crank angle corresponding to peak value P with the timing (crank angle) corresponding to the maximum magnitude of vibration in the knock waveform model, and calculates correlation coefficient K. In S112, engine ECU 200 calculates knock magnitude N by dividing peak value P by BGL.

In S114, engine ECU 200 determines whether correlation coefficient K is larger than a threshold value K(0) and knock magnitude N is larger than determination value V(KX). When correlation coefficient K is larger than threshold value K(0) and knock magnitude N is larger than determination value V(KX) (YES in S114), the process proceeds to S116. Otherwise (NO in S114), the process proceeds to S120.

Here the above-described equation (1) can be modified to:

$$K = 1 - \Sigma \Delta S(I)/S \qquad (2).$$

Equation (2) can be modified further to:

$$\Sigma \Delta S(I)/S = 1 - K \qquad (3).$$

Therefore, the fact that correlation coefficient K larger than threshold value K(0) is identical to the fact that $\Sigma \Delta S(I)/S$ is smaller than $1-K(\mathbf{0})$.

In S116, engine ECU 200 determines that knocking has occurred. In S118, engine ECU 200 retards the ignition timing.

In S120, engine ECU 200 determines that knocking has not occurred. In S122, engine ECU 200 advances the ignition timing.

An operation will be described of engine ECU 200 that is the knocking determination device according the embodiment, based on the above-described configuration and flowchart.

While engine 100 is operating, engine speed NE is detected based on the signal sent from crank position sensor 306 and intake air amount KL is detected based on the signal sent from air flow meter 314 (S100). Moreover, based on the signal sent from knock sensor 300, the magnitude of vibration of engine 100 is detected (S102).

Between the top dead center and 90° in the combustion stroke, the integrated values are calculated for every 5° (S104). In this way, the above-described vibration waveform of engine 100 as shown in FIG. 4 is detected.

As the integrated values for every 5° are used to detect the vibration waveform, the vibration waveform of which delicate magnitude variations are suppressed can be detected. Therefore, it is easy to compare the detected vibration waveform and the knock waveform model with each other.

Based on the calculated integrated values, peak value P of the integrated values in the vibration waveform of engine 100 is determined (S106).

The integrated value in the vibration waveform of engine 100 is divided by the determined peak value P to normalize the vibration waveform (S108). By this normalization, the magnitude of vibration in the vibration waveform is represented by a dimensionless number in a range of 0 to 1. Thus, regardless of the magnitude of vibration, the vibration waveform and the knock waveform model can be compared with each other. Therefore, it is unnecessary to store many knock waveform models associated with magnitudes of vibration, and accordingly the knock waveform model can be prepared easily.

The timing at which the magnitude of vibration in the normalized vibration waveform is the maximum magnitude is matched with the timing at which the magnitude of vibration in the knock waveform model is the maximum magnitude (see FIG. 6). In this state, correlation coefficient K is calculated (S110).

In this way, the degree of similarity between the detected vibration waveform and the knock waveform model can be expressed numerically and accordingly determined objectively. Further, by comparing the vibration waveform with the knock waveform model, whether or not vibration is caused by knocking can be analyzed based on the behavior of the vibration such as damping tendency of the vibration.

Further, by dividing peak value P by BGL, knock magnitude N is calculated (S112). Accordingly, based on the magnitude of vibration, it can be analyzed in more detail whether or not the vibration of engine 100 is caused by knocking.

When correlation coefficient K is larger than threshold value K(0) and knock magnitude N is larger than determination value V(KX) (YES in S114), it is determined that knocking has occurred (S116) and the ignition timing is retarded (S118). In this way, occurrence of knocking is suppressed.

When correlation coefficient K is not larger than threshold value K(0) or knock magnitude N is not larger than determination value V(KX) (NO in S114), it is determined that knocking has not occurred (S120) and the ignition timing is advanced (S122). In this way, knock magnitude N is compared with determination value V(KX) to determine in each ignition cycle whether knocking has occurred or not and accordingly the ignition timing is retarded or advanced.

In the way as described above, the engine ECU which is the knocking determination device in the embodiment determines whether or not knocking has occurred, based on the value determined by dividing $\Sigma \Delta S(I)$, which is the sum of absolute values $\Delta S(I)$ of respective differences each between the magnitude in the vibration waveform and the magnitude in the knock waveform model for each crank angle, by area S of the knock waveform model corresponding to magnitudes equal to and larger than the reference value. Thus, when the determination is made as to whether or not knocking has occurred, influences of the magnitude itself in the knock waveform model can be decreased by the reference value. Therefore, when the determination is made as to whether or not knocking has occurred, influences of the difference between the vibration waveform and the knock waveform model can be increased relatively. Accordingly, in the case where the difference between the magnitude in the vibration waveform and the magnitude in the knock waveform model is small while knocking has not occurred, occurrence of erroneous determination that knocking has occurred can be reduced.

Second Embodiment

In the following, a second embodiment of the present invention will be described. The present embodiment differs from the first embodiment in that correlation coefficient K is calculated without using area S of the knock waveform model. As to other elements and flowchart, the second embodiment is identical to the first embodiment. Respective functions are also identical to each other. Therefore, the detailed description thereof will not be repeated here.

In the present embodiment, correlation coefficient K is calculated as follows.

$$K = (N - \Sigma(\Delta S(I)/D))/N \qquad (4)$$

Here, N is the number of calculated absolute values $\Delta S(I)$ of the differences that are each between the magnitude in the vibration waveform and the magnitude in the knock waveform model. Namely, when "9" absolute values $\Delta S(I)$ are calculated, N is 9 (N=9).

Figure 10:
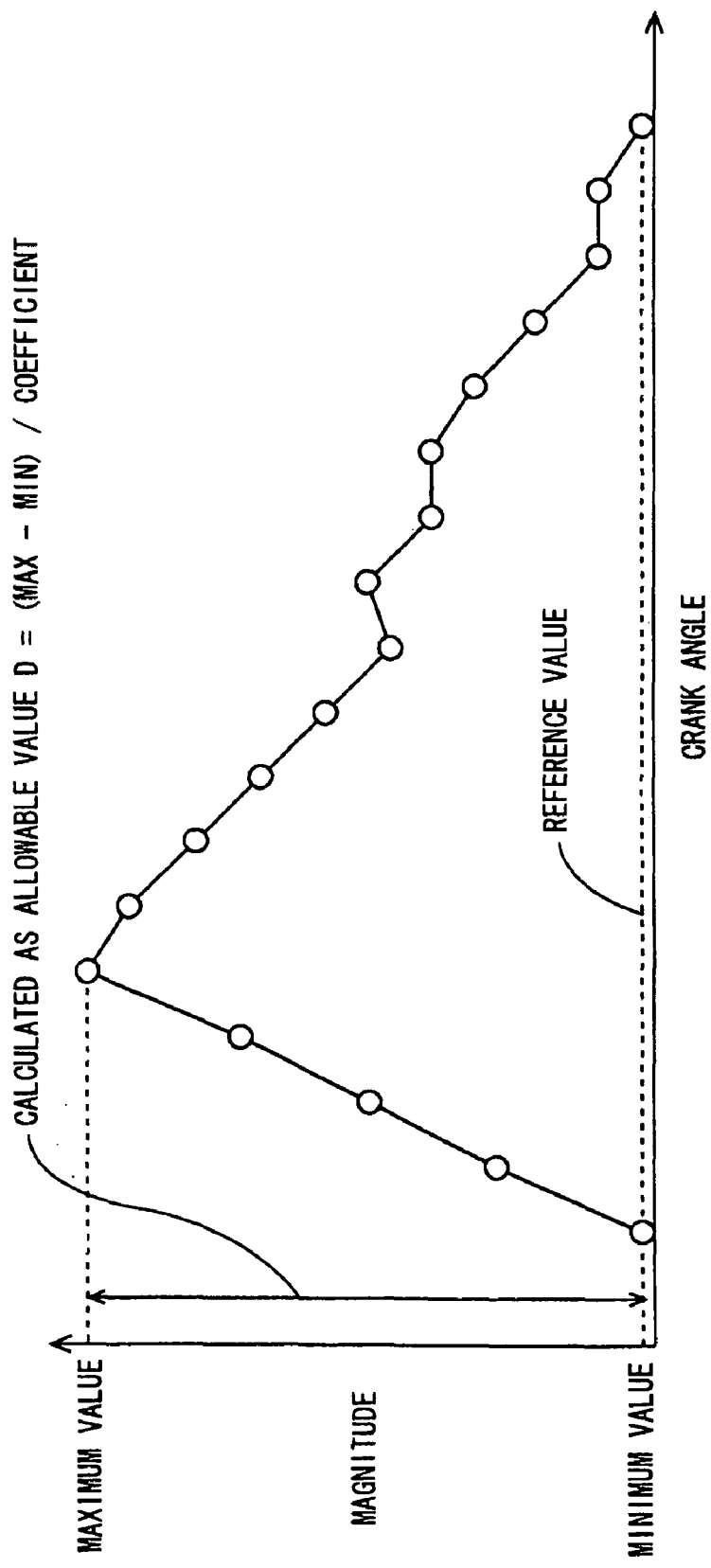
FIG. 10 is a (second) chart showing the vibration waveform of the engine.

D is an allowable value representing an allowable $\Delta S(I)$. Allowable value D is determined by subtracting a positive reference value from the maximum value of the magnitude in the vibration waveform and dividing the resultant value by a predetermined coefficient ("3" for example). As the reference value used for calculating allowable value D, the minimum value of the magnitude in the vibration waveform is used as shown in FIG. 10. As long as the reference value is a positive value, any value other than the minimum magnitude in the vibration waveform may be used. Alternatively, allowable value D may be calculated by dividing, by a predetermined coefficient, a difference between any value other than the maximum value of the magnitude in the vibration waveform and a reference value. The method of calculating correlation coefficient K is not limited to this.

The coefficient used for calculating allowable value D is changed according to the speed of engine 100. For example, as the speed of engine 100 is higher, the coefficient is made larger. Thus, as the speed of engine 100 is higher, allowable value D can be made smaller. $\Sigma(\Delta S(I)/D)$ is the sum of values each determined by dividing $\Delta S(I)$ by allowable value D.

Equation (4) as described above can be modified as follows.

$$\Sigma(\Delta S(I)/D) = N \times (1-K) \quad (5)$$

Further, equation (5) can be expressed as follows.

$$\Sigma \Delta S(I)/D = N \times (1-K) \quad (6)$$

Therefore, in the present embodiment, the fact that correlation coefficient K is larger then threshold value K(0) is identical to the fact that $\Sigma \Delta S(I)/D$ is smaller than $N \times (1-K(\mathbf{0}))$.

In the way as described above, the engine ECU which is the knock determination device in the present embodiment determines whether knocking has occurred or not, based on the value determined by dividing, by allowable value D, $\Sigma \Delta S(I)$ which is the sum of absolute values $\Delta S(I)$ of respective differences each between the magnitude in the vibration waveform and the magnitude in the knock waveform model for each crank angle. Allowable value D is calculated by subtracting a reference value from the maximum value in the vibration waveform and dividing the resultant difference by a coefficient. In this way as well, similar effects to those of the first embodiment can be achieved. Moreover, since area S of the knock waveform model is not used, a larger influence of the difference between the vibration waveform and the knock waveform model can be reflected in correlation coefficient K. Accordingly, in the case where the difference between the magnitude in the vibration waveform and the magnitude in the knock waveform model is small while knocking does not occur, occurrence of erroneous determination that knocking has occurred can be reduced.

Third Embodiment

In the following, a third embodiment of the present invention will be described. The present embodiment differs from the second embodiment in that a smoothing method called exponential smoothing is used to smooth respective minimum magnitudes in vibration waveforms detected in a plurality of ignition cycles and thereby set the reference value. As to other elements and the method of calculating correlation coefficient K for example, the third embodiment is identical to the second embodiment. Therefore, the detailed description thereof will not be repeated here.

In the present embodiment, the reference value is calculated (set) by using equation (7) or equation (8) indicated below to smooth the minimum values of magnitude in respective vibration waveforms detected previously in a plurality of ignition cycles. In equations (7) and (8) below, RV(i) represents a reference value that is calculated in the latest ignition cycle, RV(i−1) represents a reference value that is calculated in the preceding ignition cycle, MIN(i−1) represents the minimum value of magnitude in the vibration waveform detected in the preceding ignition cycle, and X and Y (Y>X) are coefficients.

$$RV(i) = RV(i-1) + X \times (\text{MIN}(i-1) - RV(i-1)) \quad (7)$$

$$RV(i) = RV(i-1) + Y \times (\text{MIN}(i-1) - RV(i-1)) \quad (8)$$

When the minimum value of magnitude in the vibration waveform detected in the (first) preceding ignition cycle is larger than the minimum value of magnitude in the vibration waveform detected in the second preceding ignition cycle, equation (7) is used to set the reference value.

When the minimum value of magnitude in the vibration waveform detected in the preceding ignition cycle is smaller than the minimum value of magnitude in the vibration waveform detected in the second preceding ignition cycle, equation (8) is used to set the reference value.

In other words, when the minimum value of magnitude in the vibration waveform detected in the latter ignition cycle is larger than the minimum value of magnitude in the vibration waveform detected in the former ignition cycle, the reference value is set by performing the smoothing to provide a smaller influence of the minimum value of magnitude in the vibration waveform detected in the latter ignition cycle as compared with the case where the minimum value in the latter ignition cycle is smaller than that detected in the former ignition cycle.

In this way, the reference value can be set to the one that changes gradually. In particular, the reference value can be set to the one that is unlikely to be large. Therefore, even if large mechanical vibration occurs due to, for example, high engine speed NE, the reference value can be prevented from becoming excessively large.

Here, the smoothing method is not limited to the above-described one. The minimum values of magnitude may be smoothed using the simple moving average or low-pass filter or the like.

Fourth Embodiment

In the following, a fourth embodiment of the present invention will be described. The present embodiment differs from the first embodiment in that the detected vibration waveform is not normalized and that the maximum value of magnitude in the knock waveform model is set based on the maximum value of magnitude in the detected vibration waveform. As to the configuration of engine 100, the fourth embodiment is identical to the first embodiment. Therefore, the detailed description thereof will not be repeated here.

As described above, when knocking occurs, vibration at a specific frequency occurs in engine 100. If the vibration is detected in a relatively broader frequency band, it is more likely that the detected vibration includes noise (for example, vibration caused by an in-cylinder injector or intake/exhaust valve sitting on its seat) other than vibration caused by knocking.

On the contrary, if the vibration is detected in a relatively narrower frequency band, any noise component included in the magnitude of the detected vibration can be suppressed while a characteristic component (such as the timing of occurrence of vibration and damping rate thereof) is removed from the vibration waveform. In this case, even if the vibration is actually due to the noise component, a vibration waveform including no noise component, namely the vibration waveform similar to the vibration waveform detected when knocking occurs is detected. Therefore, in this case, it is difficult to distinguish vibration due to knocking from vibration due to noise, based on the vibration waveform.

Accordingly, in the present embodiment, vibration is detected in a first frequency band A, a second frequency band B and a third frequency band C that are set to have a smaller bandwidth, in order to precisely capture vibration specific to knocking.

On the other hand, in order to determine whether or not knocking has occurred in consideration of noise when the noise has occurred, the vibration is detected in a broader fourth frequency band D including the first to third frequency bands A to C so as to capture the noise.

Figure 11:
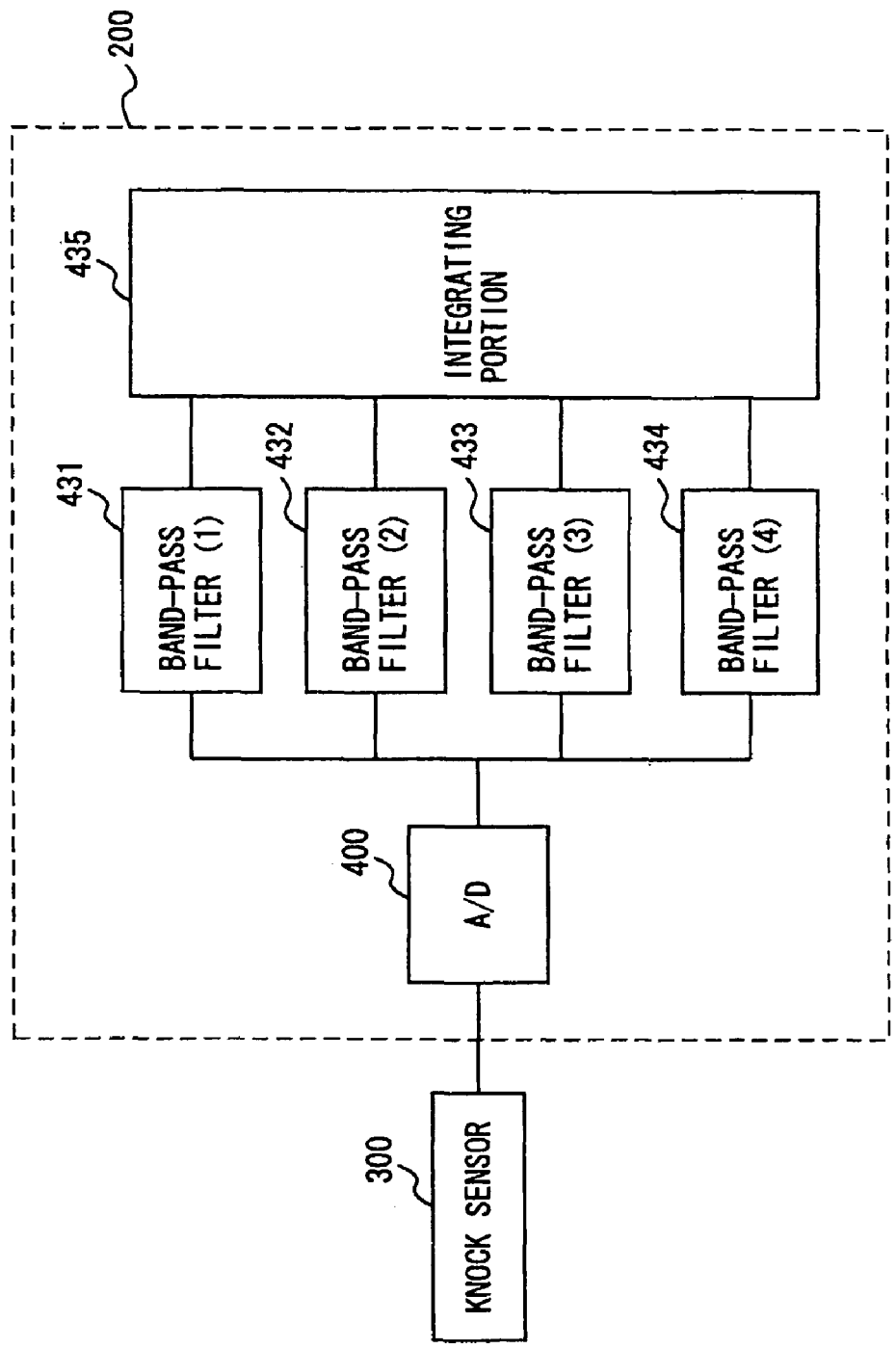
FIG. 11 is a (second) control block diagram showing an engine ECU.

As shown in FIG. 11, engine ECU 200 includes, in addition to A/D converter 400, a band-pass filter (1) 431, a band-pass filter (2) 432, a band-pass filter (3) 433, a band-pass filter (4) 434, and an integrating portion 435.

Band-pass filter (1) 431 passes only the signals in first frequency band A out of signals transmitted from knock sensor 300. In other words, band-pass filter (1) 431 extracts only the vibration in first frequency band A out of vibration detected by knock sensor 300.

Band-pass filter (2) 432 passes only the signals in second frequency band B out of signals transmitted from knock sensor 300. In other words, band-pass filter (2) 432 extracts only the vibration in second frequency band B out of vibration detected by knock sensor 300.

Band-pass filter (3) 433 passes only the signals in third frequency band C out of signals transmitted from knock sensor 300. In other words, band-pass filter (3) 433 extracts only the vibration in third frequency band C out of vibration detected by knock sensor 300.

Band-pass filter (4) 434 passes only the signals in fourth frequency band D out of signals transmitted from knock sensor 300. In other words, band-pass filter (4) 434 extracts only the vibration in fourth frequency band D out of vibration detected by knock sensor 300.

Integrating portion 435 calculates the integrated value by integrating the signals selected by band-pass filters (1) 431 to (4) 434, namely integrating the magnitudes of vibration in a range of crank angle of 5° at a time. The integrated value is calculated for each frequency band.

Further, respective integrated values calculated for first to third frequency bands A to C are added together in association with the crank angle. In other words, respective vibration waveforms of first to third frequency bands A to C are synthesized.

Thus, in the present embodiment, the synthesized waveform of first to third frequency bands A to C and the vibration waveform of fourth frequency band D are used as vibration waveforms of engine 100. The vibration waveform (integrated value) of forth frequency band D is not synthesized but used singly.

Figure 12:
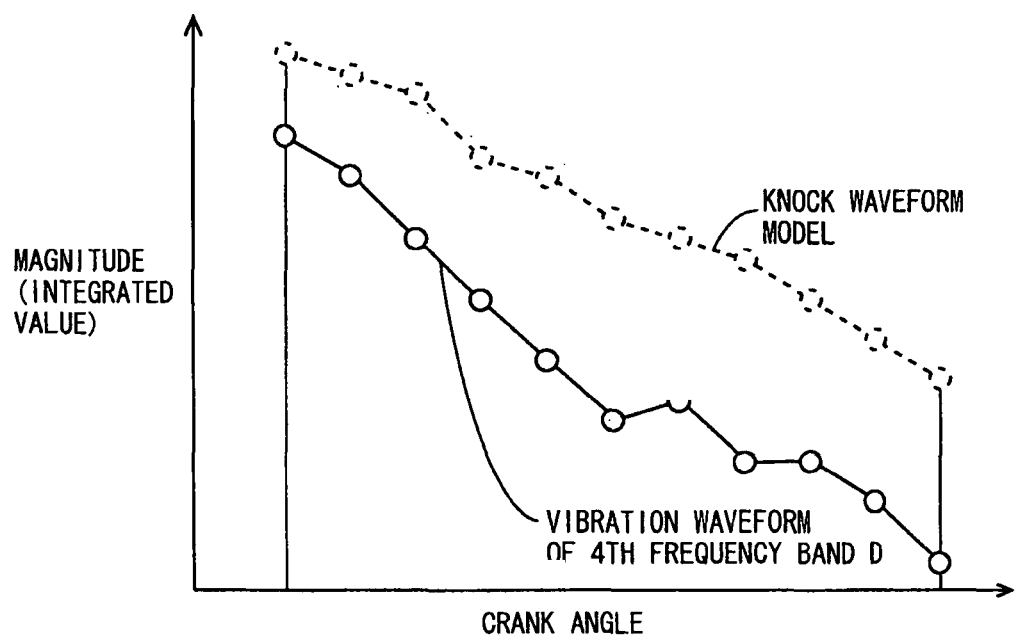
FIG. 12 is a (third) chart showing a vibration waveform and a knock waveform model compared with each other.

Of the detected vibration waveforms, the vibration waveform of fourth frequency band D is not normalized but compared with the knock waveform model as shown in FIG. 12. In the present embodiment, the magnitude in the knock waveform model is determined based on the magnitude (integrated value) in the vibration waveform of fourth frequency band D. More specifically, the maximum value of magnitude in the knock waveform model is determined based on the maximum value of magnitude in the vibration waveform of fourth frequency band D. The damping rate after the maximum value, namely the shape of the knock waveform model, is predetermined. The method of setting the maximum value of magnitude in the knock waveform model will be described hereinlater.

Figure 13:
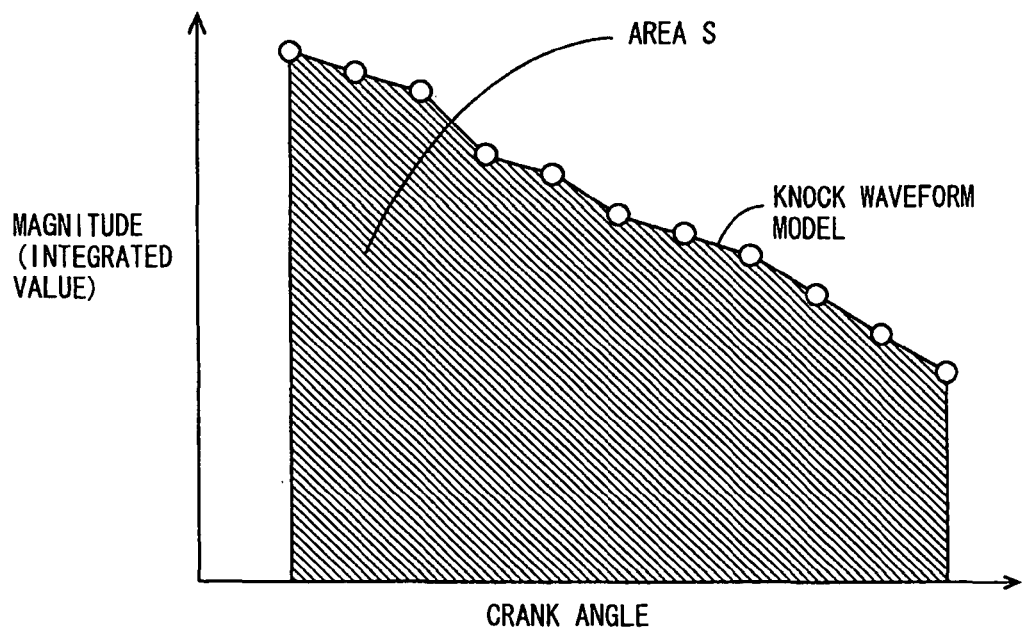
FIG. 13 shows the knock waveform model.

In the present embodiment, area S of the knock waveform model is, as shown in FIG. 13, determined by integrating the magnitude of vibration in the knock waveform model by the crank angle (the sum of magnitudes of vibration in the knock waveform model). An equation used for calculating correlation coefficient K is the same as that of the first embodiment.

The reason why the vibration waveform of the broader fourth frequency band D is compared with the knock waveform model to calculate correlation coefficient K is that the waveform shape is more precise than those of narrower first to third frequency bands A to C.

Furthermore, based on the maximum value (peak value) of the integrated values in the synthesized waveform of first to third frequency bands A to C, engine ECU 200 calculates knock magnitude N representing the magnitude of vibration. Namely, the maximum value of the integrated values in the synthesized waveform of first to third frequency bands A to C is divided by BGL to calculate knock magnitude N.

Moreover, in the present embodiment, the maximum value of the integrated values in the synthesized waveform of first to third frequency bands A to C is used to correct determination value V(KX) to be compared with knock magnitude N.

Figure 14:
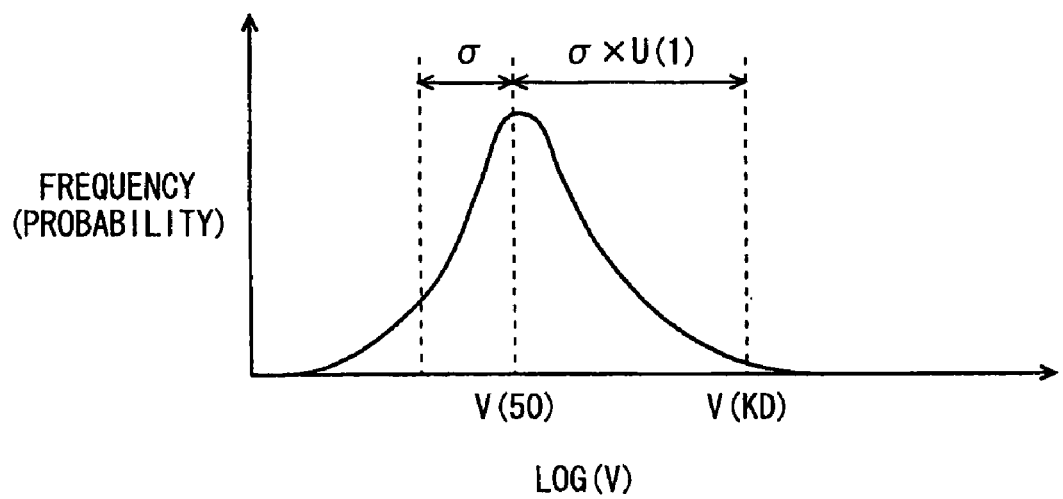
FIG. 14 shows a frequency distribution of a magnitude value LOG(V).

In order to correct determination value V(KX), knock determination level V(KD) is calculated based on a frequency distribution as shown in FIG. 14 representing the relation between a magnitude value LOG(V), which is determined by logarithmically converting the maximum value of the integrated values in the synthesized waveform of first to third frequency bands A to C, and the frequency (number of times, also called probability) at which each magnitude value LOG (V) is detected.

Magnitude value LOG(V) is calculated for each range for which engine speed NE and intake air amount KL are used as parameters. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. In the present embodiment, a median value V(50) and a standard deviation σ, which approximate the median value and standard deviation calculated based on a plurality of magnitude values LOG(V) (e.g., 200 cycles), are calculated for each ignition cycle by the following calculation method.

If the latest detected magnitude value LOG(V) is greater than the preceding calculated median value V(50), a predetermined value C(1) is added to the preceding calculated median value V(50) and the resultant value is determined as the latest median value V(50). In contrast, if the latest detected magnitude value LOG(V) is smaller than the preceding calculated median value V(50), a predetermined value C(2) (e.g., C(2) and C(1) are the same value) is subtracted from the preceding calculated median value V(50) to determine the resultant value as the latest median value V(50).

If the latest detected magnitude value LOG(V) is smaller than the preceding calculated median value V(50) and greater than a value obtained by subtracting the preceding calculated standard deviation σ from the preceding calculated median value V(50), a value twice as large as a predetermined value C(3) is subtracted from the preceding calculated standard deviation σ to determine the resultant value as the latest standard deviation σ. In contrast, if the latest detected magnitude value LOG(V) is greater than the preceding calculated median value V(50) or smaller than a value obtained by subtracting the preceding calculated standard deviation σ from the preceding calculated median value V(50), a predetermined value C(4) (e.g., C(3) and C(4) are the same value) is added to the preceding calculated standard deviation σ to determine the resultant value as the current standard deviation σ. The method of calculating median value V(50) and standard deviation σ is not limited to this. Also, initial values of median value V(50) and standard deviation σ may be values set in advance or may be "0".

Using median value V(50) and standard deviation σ, knock determination level V(KD) is calculated. As shown in FIG. 14, the product of a coefficient U(1) (U(1) is a constant and U(1)=3, for example) and standard deviation σ is added to median value V(50) and the resultant sum is knock determination level V(KD). The method of calculating knock determination level V(KD) is not limited to this.

The proportion or ratio (frequency) of magnitude values LOG(V) greater than knock determination level V(KD) is determined as a frequency of occurrence of knocking, namely the number of magnitude values LOG(V) greater than knock determination level V(KD) is counted to determine knock proportion KC. If knock proportion KC is greater than a threshold value KC(0), then determination value V(KX) is corrected to be reduced by a predetermined correction amount so that the frequency of retarding ignition timing is higher. If knock proportion KC is smaller than threshold value KC(0), then determination value V(KX) is corrected to be increased by a predetermined correction amount so that the frequency of advancing ignition timing is higher.

Coefficient U(1) is a coefficient obtained based on data and findings obtained by experiments and the like. Magnitude value LOG(V) greater than knock determination level V(KD) when U(1)=3 substantially agrees with magnitude value LOG (V) in an ignition cycle in which knocking has actually occurred. Any value other than "3" may be used as coefficient U(1).

In the following, a method of setting the maximum value of magnitude in the knock waveform model will be described. The maximum value of magnitude in the knock waveform model is set by, generating a distribution of frequency of respective maximum values of magnitude in vibration waveforms of fourth frequency band D detected in a plurality of ignition cycles.

Figure 15:
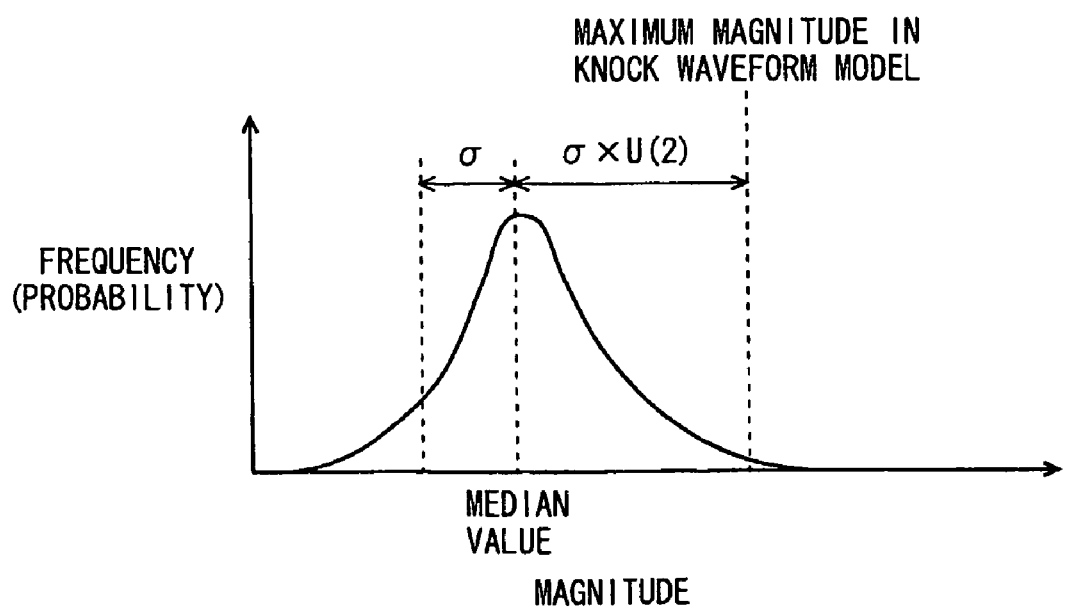
FIG. 15 shows a frequency distribution of a value determined by logarithmically converting the maximum magnitude of the vibration waveform in a fourth frequency band D.

As done for the maximum value of the integrated values in the synthesized waveform of first to third frequency bands A to C, a frequency distribution is generated for a value determined by logarithmically converting the maximum value of magnitude in the vibration waveform of fourth frequency band D as shown in FIG. 15.

For the frequency distribution, the product of coefficient U(2) (U(2)<U(1)) and standard deviation σ is added to the median value. The resultant sum is inverse logarithmically converted, and the maximum value of magnitude in the knock waveform model is set to the resultant value.

Figure 16:
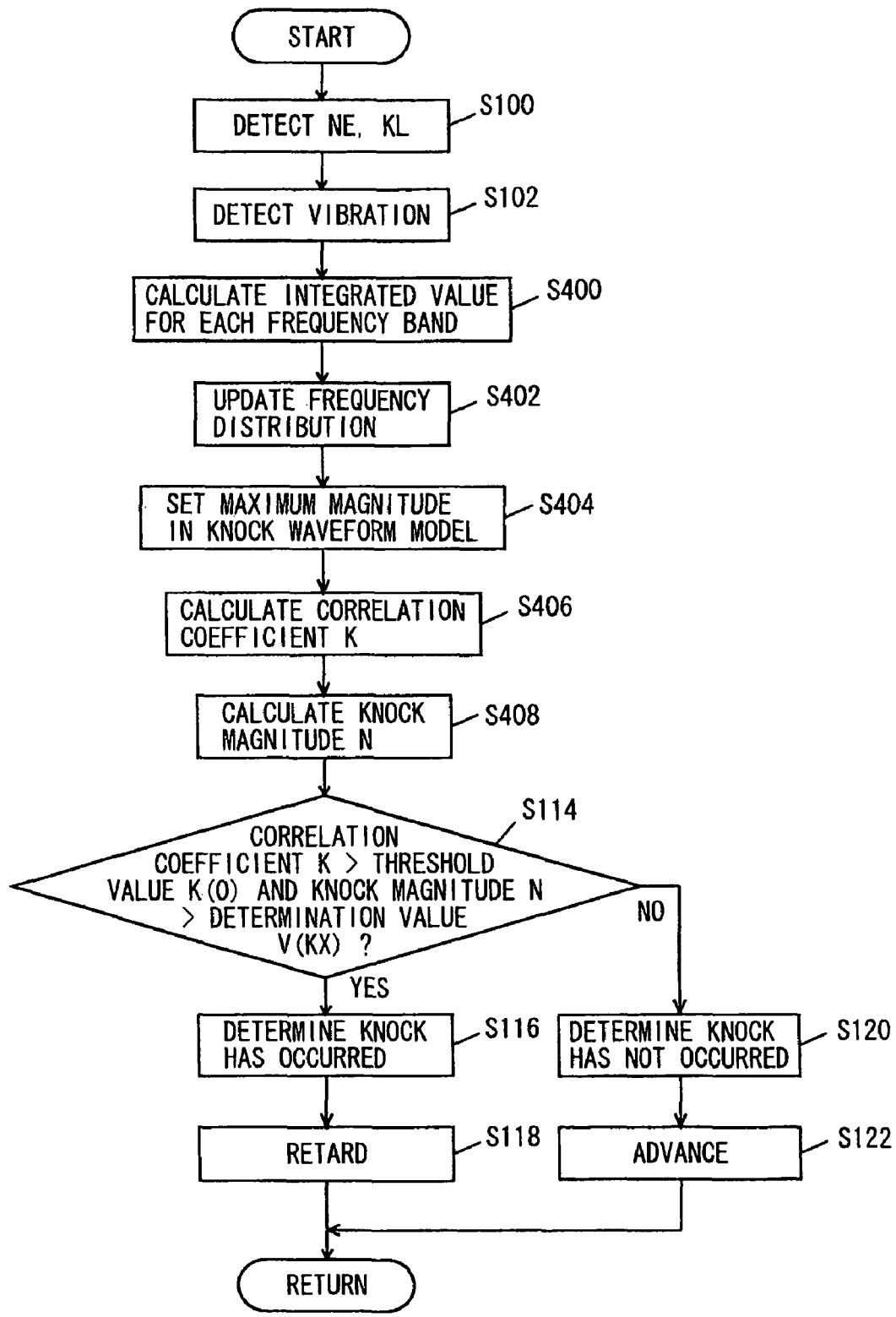
FIG. 16 is a flowchart showing a control structure of a program executed by an engine ECU that is a knocking determination device according to the fourth embodiment of the present invention.

Referring to FIG. 16, a description will be given of a control structure of a program executed by engine ECU 200 which is the knocking determination device in the present embodiment. The program described below is repeated in predetermined cycles. Further, the same process steps as those of the first embodiment are denoted by the same step number. Therefore, the detailed description thereof will not be repeated here.

In S400, engine ECU 200 calculates the integrated value by integrating output voltage values of knock sensor 300 for a range of crank angle of 5° at time for the vibration in each of first to fourth frequency bands A to D. Here, respective integrated values of first to third frequency bands A to C are added together in association with the crank angle. Namely respective vibration waveforms of first to third frequency bands A to C are synthesized.

In S402, engine ECU 200 updates the frequency distribution used for setting the maximum value of magnitude in the knock waveform model, using the maximum value of magnitude (integrated value) in the vibration waveform of fourth frequency band D detected in the latest ignition cycle. In S404, engine ECU 200 sets the maximum value of magnitude in the knock waveform model.

In S406, engine ECU 200 calculates correlation coefficient K by comparing the knock waveform model and the vibration waveform of fourth frequency band D with each other. In S408, engine ECU 200 calculates knock magnitude N by dividing the maximum value of the integrated values of the synthesized waveform of first to third frequency bands A to C by BGL.

An operation will be described of engine ECU 200 which is the knock determination device of the present embodiment, based on the above-described configuration and flowchart.

Between the top dead center and 90° in a combustion stroke, an integrated value for every 5° is calculated for each vibration of first to fourth frequency bands A to D (S400). Further, respective calculated integrated values of first to third frequency bands A to C are added together in association with the crank angle to synthesize the vibration waveforms.

By the calculation of integrated values, the synthesized waveform of first to third frequency bands as well as the vibration waveform of fourth frequency band D are detected. Of these waveforms, the vibration waveform of fourth frequency band D is compared with the knock waveform model to calculate correlation coefficient K, and the coefficient is used when it is determined in each ignition cycle whether or not knocking has occurred.

The frequency distribution is updated that is used for setting the maximum value of magnitude in the knock waveform model, using the maximum value of the integrated values in the vibration waveform of fourth frequency band D detected in the latest ignition cycle (S402). Using the frequency distribution, the maximum value of magnitude in the knock waveform model is set (S404).

Accordingly, from the maximum value of the integrated values in the vibration waveform of fourth frequency band D detected previously, any value that is regarded as the one due to knocking can be set as the maximum value of the magnitude in the knock waveform model. Therefore, if the maximum value of magnitude in the vibration waveform of fourth frequency band D is small, a larger difference can be provided between the magnitude in the knock waveform model and the magnitude in the vibration waveform.

Correlation coefficient K is calculated by comparing this knock waveform model and the vibration waveform of fourth frequency band D with each other (S406). Further, knock magnitude N is calculated by dividing, by BGL, the maximum value of the integrated values in the synthesized waveform of first to third frequency bands A to C (S408). Using these correlation coefficient K and knock magnitude N, whether or not knocking has occurred is determined.

As seen from the above, the engine ECU which is the knock determination device of the present embodiment uses the magnitude in the detected vibration waveform to set the magnitude in the knock waveform model. Correlation coefficient K is calculated based on the value determined by dividing, by area S of the knock waveform model, $\Sigma \Delta S(I)$ which is the sum of differences $\Delta S(I)$ each between the magnitude in the detected vibration waveform and the magnitude in the knock waveform model. This correlation coefficient K is used to determine whether or not knocking has occurred. Thus, in the case where the maximum value of magnitude in the detected vibration waveform is small, correlation coefficient K that can clearly reflect the difference between the magnitude in the detected vibration waveform and the magnitude in the knock waveform model can be used to determine whether knocking has occurred or not. Accordingly, in the case where knocking has not occurred, it can be correctly determined that knocking has not occurred.

Fifth Embodiment

In the following, a fifth embodiment of the present invention will be described. The present embodiment differs from the first embodiment in that the vibration waveform and the knock waveform model are compared with each other in a comparison segment that is determined according to the operating state of engine 100. The method of calculating correlation coefficient K in the present embodiment also differs from the method of calculating correlation coefficient K in the first embodiment. As to the configuration of engine 100, the present embodiment and the first embodiment are identical to each other. Therefore, the detailed description thereof will not be repeated here.

In the following, the method of calculating correlation coefficient K in the present embodiment will be described. The equation used for calculating correlation coefficient K is the same as equation (1) used in the first embodiment.

Figure 17:
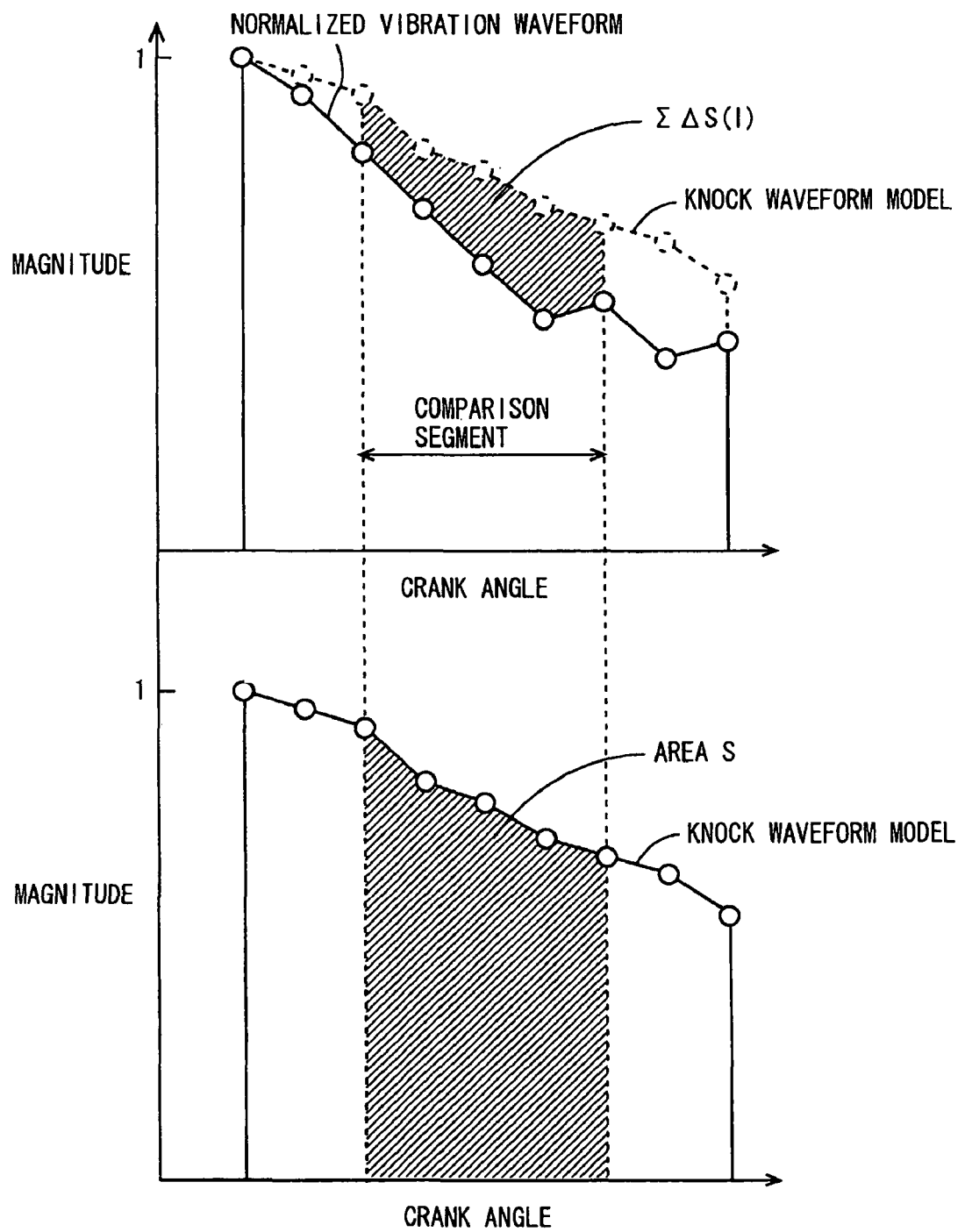
FIG. 17 is a (fourth) chart showing the vibration waveform and the knock waveform model compared with each other.

As shown in FIG. 17, in a comparison segment determined according to the operating state of engine 100, absolute values $\Delta S(I)$ are added together that are each the difference between the magnitude in the normalized vibration waveform and the magnitude in the knock waveform model for each crank angle.

Namely, in equation (1) used for calculating the correlation coefficient, the sum of $\Delta S(I)$ in the comparison segment is used as $\Sigma \Delta S(I)$. Further, as area S of the knock waveform model, the value determined by integrating (summing) the magnitudes in the comparison segment of the knock waveform model is used.

Here, in the similar manner to that of the first embodiment, the crank angle at which the magnitude (integrated value) of the detected vibration waveform has the peak value P and the timing at which the magnitude of vibration has the maximum value in the knock waveform model are matched each other, and correlation coefficient K is calculated.

The comparison segment is set, for example, according to a map using engine speed NE and load as parameters. When engine speed NE is smaller than a threshold value, a range of crank angle of 0 to 20° is set as the comparison segment. Specifically, as engine speed NE is lower, the comparison segment is set to a more advanced range of crank angle. The comparison segment may be set according to any one of engine speed NE and the load. The method of setting the comparison segment is not limited to this.

Figure 18:
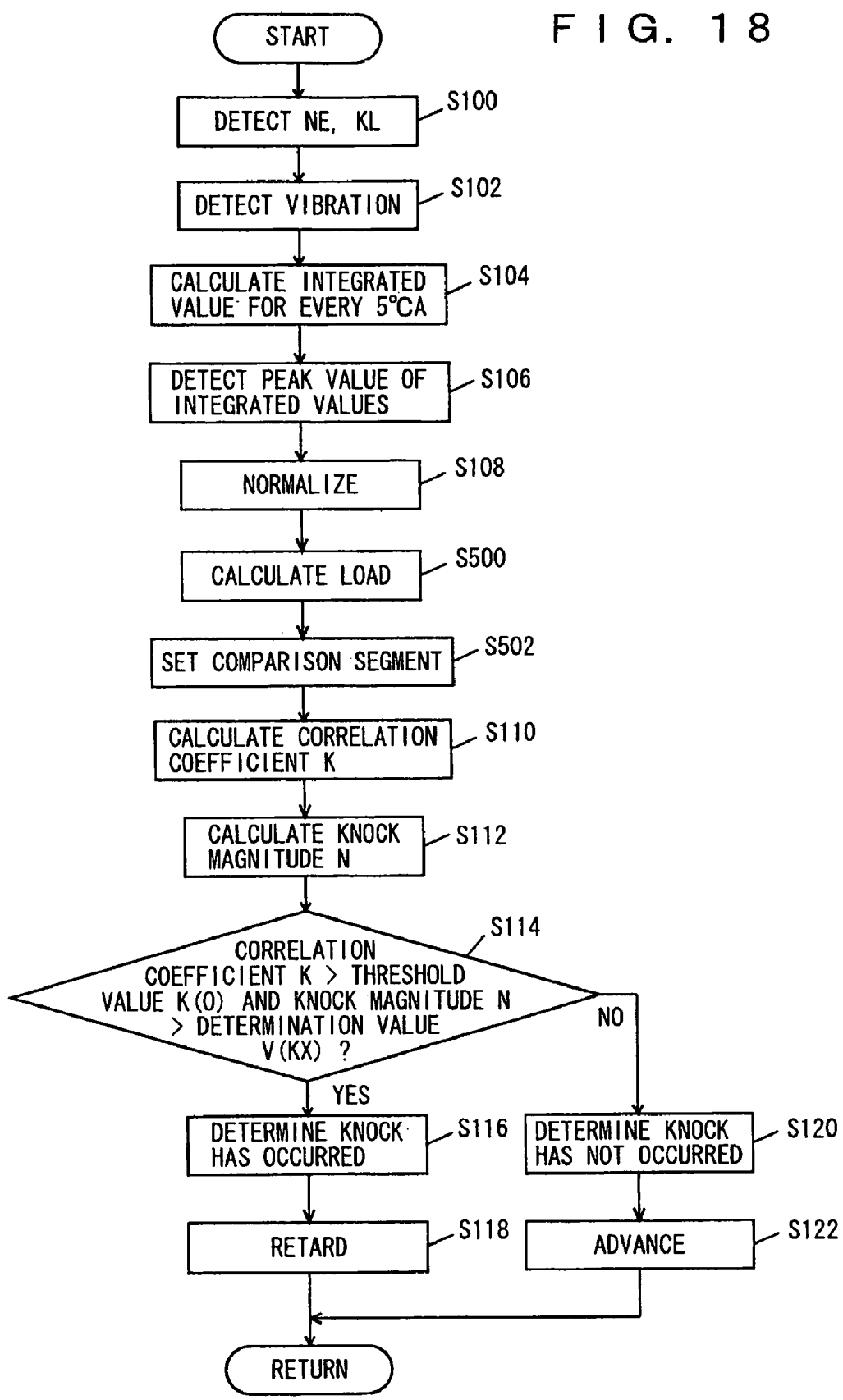
FIG. 18 is a flowchart showing a control structure of a program executed by an engine ECU that is a knocking determination device according to a fifth embodiment of the present invention.

Referring to FIG. 18, a description will be given of a control structure of a program executed by engine ECU 200 which is the knocking determination device in the present embodiment. The program described below is repeatedly executed in predetermined cycles. The same process step as that of the first embodiment is denoted by the same step number. Therefore, the detailed description thereof will not be repeated here.

In S500, engine ECU 200 calculates the load of engine 100 based on engine speed NE and intake air amount KL. The method of calculating the load of engine 100 may be any general well-known technique. Therefore, the detailed description thereof will not be repeated here. In S502, engine ECU 200 sets the comparison segment for comparing the knock waveform model and the vibration waveform with each other, according to engine speed NE and the load.

Thus, according to engine speed NE and the load, the comparison segment can be set in which the difference is clearly seen between the waveform due to knocking and the noise (vibration caused when the in-cylinder injector or intake/exhaust valve sits on its seat) other than vibration caused by knocking.

Therefore, if the detected vibration waveform and the knock waveform model are partially different from each other, it can be determined that knocking has not occurred. Thus, when knocking has not occurred, it can correctly be determined that knocking has not occurred.

Sixth Embodiment

In the following, a sixth embodiment of the present invention will be described. The present embodiment differs form the first embodiment in that a vibration waveform obtained by subtracting a reference value from the magnitude in the detected vibration waveform is compared with the knock waveform model. As to the configuration of engine 100, the present embodiment is identical to the first embodiment. Therefore, the detailed description thereof will not be repeated here.

In the following, a method of calculating correlation coefficient K in the present embodiment will be described. The equation used for calculating correlation coefficient K is the same as equation (1) in the first embodiment.

Figure 19:
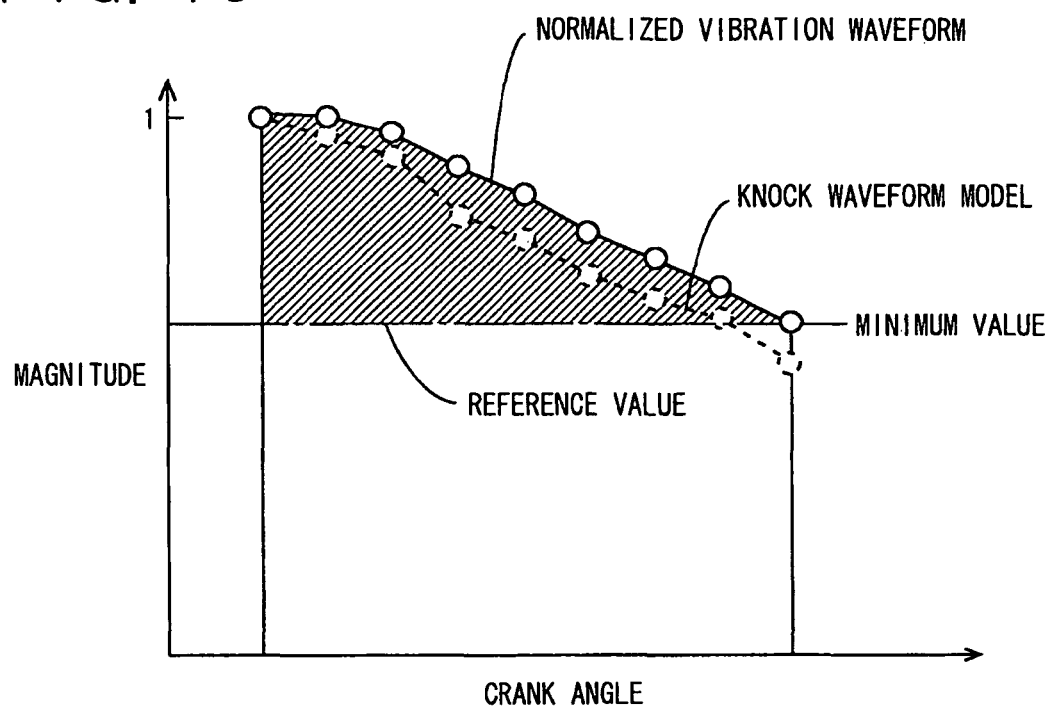
FIG. 19 is a (third) chart showing a vibration waveform of the engine.
Figure 20:
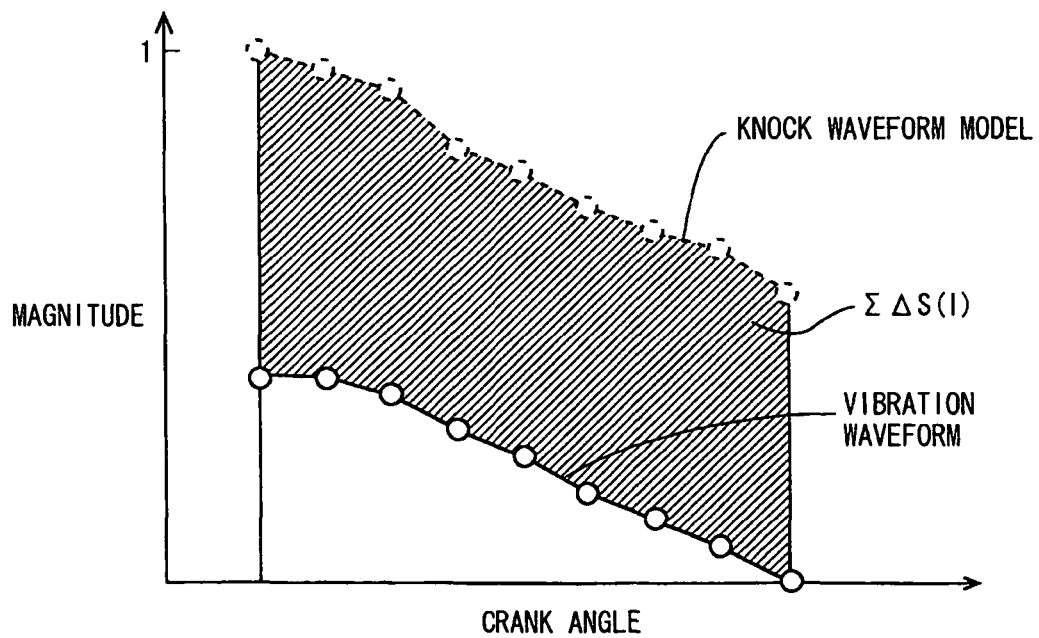
FIG. 20 is a (fifth) diagram showing the vibration waveform and the knock waveform model compared with each other.

As shown in FIG. 19, in the present embodiment, a reference value is subtracted from the magnitude in the normalized vibration waveform to obtain a vibration waveform to be used that is determined by removing the portion less than the reference value from the normalized vibration waveform only.

Figure 21:
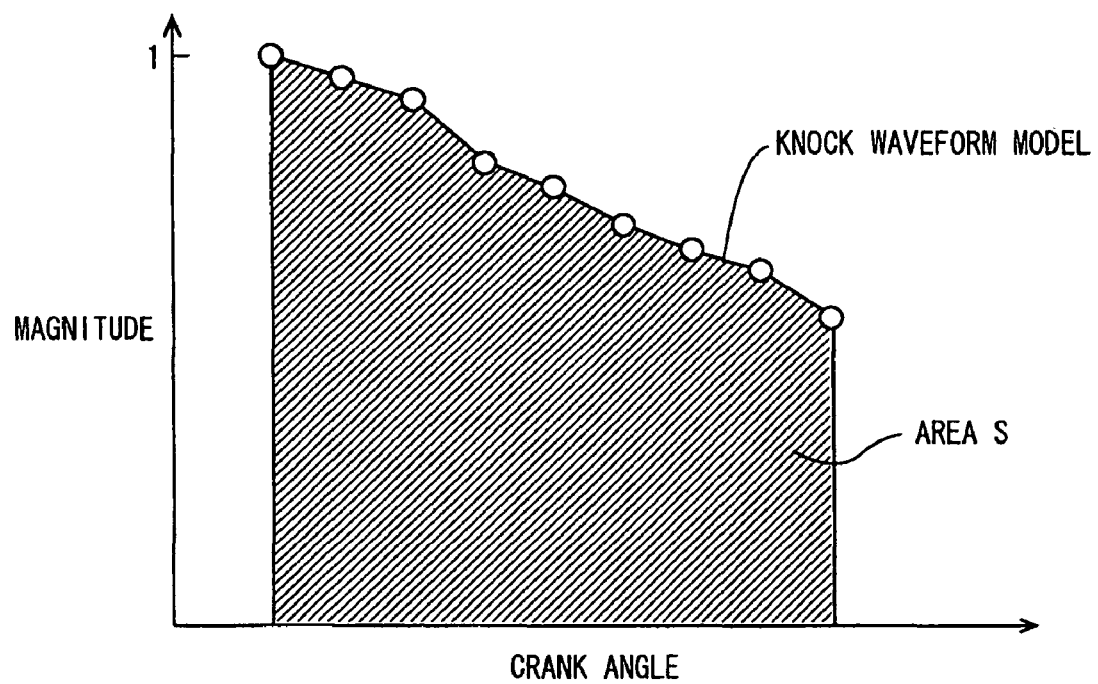
FIG. 21 is a chart showing an area S of the knock waveform model.

Thus, when absolute value $\Delta S(I)$ of the difference between respective magnitudes in the vibration waveform and the knock waveform model is calculated, $\Sigma \Delta S(I)$ is calculated by adding together absolute values $\Delta S(I)$ that are each the difference between the magnitude in the knock waveform model and the magnitude in the vibration waveform whose magnitude is reduced by the reference value. Further as shown in FIG. 21, area S of the knock waveform model is determined by integrating (adding together) the magnitudes in the knock waveform model.

Similarly to the first embodiment, the reference value to be used is the minimum value of magnitude in the vibration waveform in a range of crank angle in which the difference between the magnitude in the vibration waveform and the magnitude in the knock waveform model is calculated. Here, the minimum value of magnitude in the detected vibration waveform, namely the minimum value of magnitude in the knock detection gate may be used as the reference value. Alternatively, any value other than the minimum value of magnitude in the vibration waveform may be used.

In this way, the difference between the magnitude in the vibration waveform and the magnitude in the knock waveform model can be increased by the reference value. Thus, even if the detected vibration waveform is similar to that of the knock waveform model, it can appropriately be determined that knocking has occurred if respective magnitudes are different from each other. Accordingly, erroneous determination can be reduced that is the determination that knocking has occurred regardless of the fact that knocking has not occurred.

Embodiments herein disclosed are to be construed as examples and illustration in all respects, not as limitations. It is intended that the scope of the invention is defined by claims, not by the description above, and includes all modifications within the range equivalent in meaning and scope to the claims.

The invention claimed is:

1. A device for determining knocking of an internal combustion engine, comprising:
a crank position sensor detecting a crank angle of said internal combustion engine;
a knock sensor detecting a magnitude of vibration of said internal combustion engine in association with the crank angle; and
an operation unit, wherein
said operation unit detects a waveform of vibration in a predetermined interval of crank angle, based on the magnitude of vibration of said internal combustion engine,
said operation unit calculates a first value based on a difference between a magnitude in said detected waveform and a magnitude in a waveform model that is predetermined as a reference of the waveform of vibration of said internal combustion engine,
said operation unit calculates a second value based on one of a value determined by subtracting a positive reference value from the magnitude in said waveform model and a value determined by subtracting said reference value from the magnitude in said detected waveform,
said operation unit calculates a third value based on said first value and said second value, and
said operation unit determines whether or not knocking has occurred in said internal combustion engine based on said third value.

2. The device according to claim 1, wherein
said operation unit calculates said first value that is smaller as the difference between the magnitude in said detected waveform and the magnitude in said waveform model is smaller,
said operation unit calculates said second value that is smaller as one of the value determined by subtracting said reference value from the magnitude in said waveform model and the value determined by subtracting said reference value from the magnitude in said detected waveform is smaller,
said operation unit calculates said third value that is smaller as said first value is smaller and that is larger as said second value is smaller, and
said operation unit determines that knocking has occurred in said internal combustion engine when said third value is smaller than a predetermined value.

3. The device according to claim 2, wherein
said operation unit calculates said first value by summing differences that are each a difference between a magnitude in said detected waveform and a magnitude in said waveform model for every predetermined crank angle.

4. The device according to claim 2, wherein
said second value calculated by said operation unit is one of a value determined by summing a plurality of values that are each obtained by subtracting said reference value from a magnitude in said waveform model for every predetermined crank angle, and a value determined by dividing, by a coefficient, a value obtained by subtracting said reference value from a maximum value of magnitude in said detected waveform.

5. The device according to claim 2, wherein
said operation unit calculates said third value by dividing said first value by said second value.

6. The device according to claim 1, wherein
said reference value is a minimum value of magnitude in said detected waveform in a range of crank angle for which the difference between the magnitude in said detected waveform and the magnitude in said waveform model is calculated.

7. A device for determining knocking of an internal combustion engine, comprising:
a crank position sensor detecting a crank angle of said internal combustion engine;
a knock sensor detecting a magnitude of vibration of said internal combustion engine in association with the crank angle; and
an operation unit, wherein
said operation unit detects a waveform of vibration in a predetermined interval of crank angle, based on the magnitude of vibration of said internal combustion engine,
said operation unit sets a magnitude in a waveform model that is a reference of the waveform of vibration of said internal combustion engine, based on respective magnitudes in respective waveforms detected in a plurality of ignition cycles,
said operation unit calculates a first value based on a difference between a magnitude in said detected waveform and a magnitude in said waveform model,
said operation unit calculates a second value based on the magnitude in said waveform model,
said operation unit calculates a third value based on said first value and said second value, and
said operation unit determines whether or not knocking has occurred in said internal combustion engine based on said third value.

8. The device according to claim 7, wherein
said operation unit sets a maximum value of magnitude in said waveform model, based on respective maximum values of magnitude in respective waveforms detected in said plurality of ignition cycles.

9. The device according to claim 7, wherein
said operation unit calculates said first value by summing differences that are each a difference between a magnitude in said detected waveform and a magnitude in said waveform model,
said operation unit calculates said second value by summing magnitudes in said waveform model,
said operation unit calculates said third value by dividing said first value by said second value, and
said operation unit determines that knocking has occurred in said internal combustion engine when said third value is smaller than a predetermined value.

10. A device for determining knocking of an internal combustion engine, comprising:
a crank position sensor detecting a crank angle of said internal combustion engine;
a knock sensor detecting a magnitude of vibration of said internal combustion engine in association with the crank angle; and
an operation unit, wherein
said operation unit detects a waveform of vibration in a first interval of crank angle, based on the magnitude of vibration of said internal combustion engine,
said operation unit sets a second interval of crank angle according to an operating state of said internal combustion engine,
said operation unit calculates a first value based on a difference, in said second interval, between a magnitude in said detected waveform and a magnitude in a waveform model that is predetermined as a reference of the waveform of vibration of said internal combustion engine, said operation unit calculates a second value based on the magnitude in said waveform model in said second interval, said operation unit calculates a third value based on said first value and said second value, and said operation unit determines whether or not knocking has occurred in said internal combustion engine based on said third value.

11. A device for determining knocking of an internal combustion engine, comprising:

a crank position sensor detecting a crank angle of said internal combustion engine;

a knock sensor detecting a magnitude of vibration of said internal combustion engine in association with the crank angle; and an operation unit, wherein said operation unit detects a waveform of vibration in a predetermined interval of crank angle, based on a magnitude obtained by subtracting a positive reference value from the magnitude of vibration of said internal combustion engine, said operation unit calculates a first value based on a difference between a magnitude in said detected waveform and a magnitude in a waveform model that is predetermined as a reference of the waveform of vibration of said internal combustion engine, said operation unit calculates a second value based on the magnitude in said waveform model, said operation unit calculates a third value based on said first value and said second value, and said operation unit determines whether or not knocking has occurred in said internal combustion engine based on said third value.

12. A method for determining knocking of an internal combustion engine, comprising:

detecting a crank angle of said internal combustion engine;

detecting a magnitude of vibration of said internal combustion engine in association with the crank angle;

detecting a waveform of vibration in a predetermined interval of crank angle, based on the magnitude of vibration of said internal combustion engine;

calculating a first value based on a difference between a magnitude in said detected waveform and a magnitude in a waveform model that is predetermined as a reference of the waveform of vibration of said internal combustion engine;

calculating a second value based on one of a value determined by subtracting a positive reference value from the magnitude in said waveform model and a value determined by subtracting said reference value from the magnitude in said detected waveform;

calculating a third value based on said first value and said second value; and determining whether or not knocking has occurred in said internal combustion engine based on said third value.

13. A method for determining knocking of an internal combustion engine, comprising:

detecting a crank angle of said internal combustion engine;

detecting a magnitude of vibration of said internal combustion engine in association with the crank angle;

detecting a waveform of vibration in a predetermined interval of crank angle, based on the magnitude of vibration of said internal combustion engine;

setting a magnitude in a waveform model that is a reference of the waveform of vibration of said internal combustion engine, based on respective magnitudes in respective waveforms detected in a plurality of ignition cycles;

calculating a first value based on a difference between a magnitude in said detected waveform and a magnitude in said waveform model;

calculating a second value based on the magnitude in said waveform model;

calculating a third value based on said first value and said second value; and determining whether or not knocking has occurred in said internal combustion engine based on said third value.

14. The method according to claim 13, wherein said calculating said first value includes calculating said first value by summing differences that are each a difference between a magnitude in said detected waveform and a magnitude in said waveform model, said calculating said second value includes calculating said second value by summing magnitudes in said waveform model, said calculating said third value includes calculating said third value by dividing said first value by said second value, and said determining whether or not knocking has occurred includes determining that knocking has occurred in said internal combustion engine when said third value is smaller than a predetermined value.

15. A method for determining knocking of an internal combustion engine, comprising:

detecting a crank angle of said internal combustion engine;

detecting a magnitude of vibration of said internal combustion engine in association with the crank angle;

detecting a waveform of vibration in a first interval of crank angle, based on the magnitude of vibration of said internal combustion engine;

setting a second interval of crank angle according to an operating state of said internal combustion engine;

calculating a first value based on a difference, in said second interval, between a magnitude in said detected waveform and a magnitude in a waveform model that is predetermined as a reference of the waveform of vibration of said internal combustion engine;

calculating a second value based on the magnitude in said waveform model in said second interval;

calculating a third value based on said first value and said second value; and determining whether or not knocking has occurred in said internal combustion engine based on said third value.

* * * * *